US012339471B2

(12) United States Patent
Hebrink et al.

(10) Patent No.: US 12,339,471 B2
(45) Date of Patent: *Jun. 24, 2025

(54) COMPOSITE COOLING FILM AND ARTICLE INCLUDING THE SAME

(71) Applicant: 3M INNOVATIVE PROPERTIES COMPANY, St. Paul, MN (US)

(72) Inventors: Timothy J. Hebrink, Scandia, MN (US); Michelle M. Mok, St. Paul, MN (US); Derek J. Dehn, Maplewood, MN (US); Mary E. Johansen, Woodbury, MN (US); Lon R. Johnson, New Brighton, MN (US); Todd G. Pett, St. Paul, MN (US); Moses M. David, Woodbury, MN (US); James P. Burke, St. Paul, MN (US); Vivian W. Jones, Woodbury, MN (US); Haiyan Zhang, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 776 days.

This patent is subject to a terminal disclaimer.

(21) Appl. No.: 17/609,690

(22) PCT Filed: May 21, 2020

(86) PCT No.: PCT/IB2020/054851
§ 371 (c)(1),
(2) Date: Nov. 8, 2021

(87) PCT Pub. No.: WO2020/240366
PCT Pub. Date: Dec. 3, 2020

(65) Prior Publication Data
US 2022/0221627 A1    Jul. 14, 2022

Related U.S. Application Data

(60) Provisional application No. 62/855,392, filed on May 31, 2019.

(51) Int. Cl.
*G02B 5/20* (2006.01)
*B32B 3/30* (2006.01)
(Continued)

(52) U.S. Cl.
CPC .............. *G02B 5/0841* (2013.01); *B32B 3/30* (2013.01); *F28F 13/185* (2013.01); *G02B 1/18* (2015.01);
(Continued)

(58) Field of Classification Search
CPC . G02B 1/00; G02B 1/04; G02B 1/045; G02B 1/10; G02B 1/11; G02B 1/111;
(Continued)

(56) References Cited

U.S. PATENT DOCUMENTS 4,726,989 A    2/1988  Mrozinksi
4,874,567 A   10/1989  Lopatin
(Continued)

FOREIGN PATENT DOCUMENTS

JP    2004092931      3/2004
JP    2005028926 A    2/2005
(Continued)

OTHER PUBLICATIONS

Addeo, "Light selective structures for large scale natural air conditioning", Solar Energy, 1980, vol. 24, pp. 93-98.
(Continued)

*Primary Examiner* — Thong Q Nguyen

(57) ABSTRACT

A composite cooling film comprises an ultraviolet-reflective multilayer optical film and a reflective microporous layer secured thereto. The ultraviolet-reflective multilayer optical film is at least 50 percent reflective of ultraviolet radiation over a majority of the wavelength range of at least 340 but less than 400 nanometers. The reflective microporous layer has a continuous phase comprising a nonfluorinated organic
(Continued)

polymer and is diffusely reflective of solar radiation over a majority the wavelength range of 400 to 2500 nanometers, inclusive. The composite cooling film has an average absorbance over the wavelength range of 8 to 13 microns of at least 0.85. An article comprising the composite cooling film adhered to a substrate is also disclosed.

24 Claims, 13 Drawing Sheets

(51) Int. Cl.
 F28F 13/18 (2006.01)
 G02B 1/18 (2015.01)
 G02B 5/08 (2006.01)
(52) U.S. Cl.
 CPC ...... *G02B 5/0891* (2013.01); *G02B 2207/101* (2013.01)
(58) Field of Classification Search
 CPC .......... G02B 1/113; G02B 1/115; G02B 1/14; G02B 1/16; G02B 1/18; G02B 5/00; G02B 5/003; G02B 5/006; G02B 5/02; G02B 5/021; G02B 5/0215; G02B 5/0221; G02B 5/0226; G02B 5/0231; G02B 5/0242; G02B 5/0247; G02B 5/0268; G02B 5/04; G02B 5/045; G02B 5/0816; G02B 5/0833; G02B 5/0841; G02B 5/0866; G02B 5/0891
 USPC .................................. 359/350–361, 577–599
 See application file for complete search history.

(56) References Cited

U.S. PATENT DOCUMENTS

| | | | |
|---|---|---|---|
| 4,976,859 A | 12/1990 | Wechs | |
| 5,126,394 A | 6/1992 | Revis | |
| 5,238,623 A | 8/1993 | Mrozinski | |
| 5,882,774 A | 3/1999 | Jonza | |
| 5,993,954 A | 11/1999 | Radovanovic | |
| 6,045,894 A | 4/2000 | Jonza | |
| 6,261,994 B1 | 7/2001 | Bourdelais | |
| 6,277,485 B1 | 8/2001 | Invie | |
| 6,352,761 B1 | 3/2002 | Hebrink | |
| 6,368,699 B1 | 4/2002 | Gilbert | |
| 6,368,742 B2 | 4/2002 | Fisher | |
| 6,376,590 B2 | 4/2002 | Kolb | |
| 6,449,093 B2 | 9/2002 | Hebrink | |
| 6,531,230 B1 | 3/2003 | Weber | |
| 6,632,850 B2 | 10/2003 | Hughes | |
| 6,667,095 B2 | 12/2003 | Wheatley | |
| 6,744,561 B2 | 6/2004 | Condo | |
| 6,783,349 B2 | 8/2004 | Neavin | |
| 7,153,588 B2 | 12/2006 | McMan | |
| 7,271,951 B2 | 9/2007 | Weber | |
| 7,328,638 B2 | 2/2008 | Gardiner | |
| 7,345,137 B2 | 3/2008 | Hebrink | |
| 7,350,442 B2 | 4/2008 | Ehnes | |
| 7,632,568 B2 | 12/2009 | Padiyath | |
| 7,652,736 B2 | 1/2010 | Padiyath | |
| 7,952,805 B2 | 5/2011 | McGurran | |
| 8,234,998 B2 | 8/2012 | Krogman | |
| 8,313,798 B2 | 11/2012 | Nogueira | |
| 8,962,214 B2 | 2/2015 | Smith | |
| 9,523,516 B2 | 12/2016 | Hebrink | |
| 9,670,300 B2 | 6/2017 | Olson | |
| 9,709,349 B2 | 7/2017 | Raman | |
| 9,902,869 B2 | 2/2018 | Schmidt | |
| 9,923,111 B2 | 3/2018 | Fan | |
| 10,088,251 B2 | 10/2018 | Raman | |
| 10,240,013 B2 | 3/2019 | Mrozinski | |
| 11,634,613 B2* | 4/2023 | Hebrink | B32B 7/06 428/141 |
| 11,906,252 B2* | 2/2024 | Hebrink | B32B 7/12 |
| 11,906,701 B2* | 2/2024 | Hebrink | E04D 13/03 |
| 2005/0233070 A1 | 10/2005 | Pellerite | |
| 2006/0004780 A1 | 1/2006 | Maeda | |
| 2006/0148950 A1 | 7/2006 | Davidson | |
| 2009/0147361 A1 | 6/2009 | Gardiner | |
| 2009/0283144 A1 | 11/2009 | Hebrink | |
| 2010/0290109 A1 | 11/2010 | Kurt | |
| 2011/0064936 A1 | 3/2011 | Hammond-Cunningham | |
| 2011/0123788 A1 | 5/2011 | Viasnoff | |
| 2012/0011850 A1 | 1/2012 | Hebrink | |
| 2012/0148829 A1 | 6/2012 | Krogman | |
| 2013/0236697 A1 | 9/2013 | Walker, Jr. | |
| 2014/0131023 A1 | 5/2014 | Raman | |
| 2015/0131146 A1 | 5/2015 | Fan | |
| 2015/0175479 A1 | 6/2015 | Brown | |
| 2015/0338175 A1 | 11/2015 | Raman | |
| 2016/0268464 A1 | 9/2016 | Fan | |
| 2016/0298266 A1 | 10/2016 | Zillig | |
| 2017/0198129 A1 | 7/2017 | Olson | |
| 2017/0248381 A1 | 8/2017 | Yang | |
| 2018/0180331 A1 | 6/2018 | Yu | |
| 2018/0244928 A1 | 8/2018 | Van Overmeere et al. | |
| 2019/0086164 A1 | 3/2019 | Yang et al. | |
| 2019/0184687 A1 | 6/2019 | Yasuda | |
| 2022/0355567 A1* | 11/2022 | Hebrink | B32B 27/308 |

FOREIGN PATENT DOCUMENTS

| | | |
|---|---|---|
| JP | 2006231869 A | 9/2006 |
| JP | 2009255487 A | 11/2009 |
| WO | WO 1995-017303 | 6/1995 |
| WO | WO 1999-039224 | 8/1999 |
| WO | WO 2000-048037 | 8/2000 |
| WO | WO 2002-012404 | 2/2002 |
| WO | WO 2005-116915 | 12/2005 |
| WO | WO 2010-059416 | 5/2010 |
| WO | WO 2012-112624 | 8/2012 |
| WO | WO 2013-142239 | 9/2013 |
| WO | WO 2014-008383 | 1/2014 |
| WO | WO 2014-099367 | 6/2014 |
| WO | WO 2017-151514 | 9/2017 |
| WO | WO 2017-172564 | 10/2017 |
| WO | WO 2018-043298 | 3/2018 |
| WO | WO 2018-062541 | 4/2018 |
| WO | WO 2018-130926 | 7/2018 |
| WO | WO 2018-180177 | 10/2018 |
| WO | WO 2019-130198 | 7/2019 |
| WO | WO 2019-130199 | 7/2019 |
| WO | WO 2019-234560 | 12/2019 |
| WO | WO 2020-109926 | 6/2020 |
| WO | WO 2020-240447 | 12/2020 |

OTHER PUBLICATIONS

Gentle, "A subambient open roof surface under the mid-summer sun", Advanced Science, 2015, vol. 2, 1500119 (1-4pages).

Hossain, "A metamaterial emitter for highly efficient radiative cooling", Advanced Optical Materials, 2015, vol. 3, pp. 1047-1051.

Hossain, "Radiative cooling: Principles, progress and potentials", Advanced Science, 2016, vol. 3, 1500360 (1-10pages).

Li, "Radiative Cooling Paint", 2018, 7 pages.

Mandal, "Hierarchically porous polymer coatings for highly efficient passive daytime radiative cooling", Science, 2018, vol. 362, pp. 315-319.

Peoples, "A strategy of hierarchical particle sizes in nanoparticles composite for enhancing solar reflection", Internal journal of heat and mass transfer, 2019, vol. 131, pp. 487-494.

Raman, "Passive radiative cooling below ambient air temperature under direct sunlight", Nature, 2014, vol. 515, pp. 540-544.

Yang, "A dual-layer structure with record-high solar reflectance for daytime radiative cooling", Solar Energy, 2018, vol. 169, pp. 316-324.

(56) References Cited

OTHER PUBLICATIONS

Zhai, "Scalable-manufactured randomized glass-polymer hybrid metamaterial for daytime radiative cooling", Science, 2017, vol. 255, pp. 1062-1066.

Zhang, "Spectral radiative properties of micro/nanostructured materials", Seminar at 3M, Oct. 4, 2018, 40 pages.

Zhao, "Radiative sky cooling: fundamental principles, materials, and applications", Appl. Phys. Rev. 6, 2019, 021306 (41 pages).

International Search report for PCT International Application No. PCT/IB2020/054851 mailed on Oct. 8, 2021, 6 pages.

\* cited by examiner

COMPOSITE COOLING FILM AND ARTICLE INCLUDING THE SAME

CROSS-REFERENCE TO RELATED APPLICATIONS

This application is a national stage filing under 35 U.S.C. 371 of PCT/IB2020/054851, filed May 21, 2020, which claims priority to U.S. Provisional Application No. 62/855,392, filed May 31, 2019, the disclosure which is incorporated by reference in its entirety herein.

TECHNICAL FIELD

The present disclosure broadly relates passive radiative cooling films and articles.

BACKGROUND

The Earth's atmosphere has a semi-transparent window in the infrared wavelength range between 8 and 13 microns, i.e., the atmosphere's radiative emission is very weak in that window. Outside the atmospheric window, the Earth's atmosphere is highly emissive. Coincidentally, the atmospheric window falls within the peak thermal radiation of a black body defined by Planck's law at ambient temperature (i.e., around 300 degrees Kelvin (K)). This feature enables a potential passive cooling mechanism for a terrestrial body at ambient temperature by eliminating heat via radiative emission through the atmospheric window. The emitted radiation escapes high into the upper atmosphere where it is much colder than on the Earth's surface. The atmospheric window allows the outgoing radiative emission of surfaces having high solar reflectance to exceed its absorbed incoming atmospheric radiation and thus to passively cool below the ambient temperature. Along with the effect of the incoming atmospheric radiation, the cooling performance of a radiator depends on other factors such as, for example, the emissivity of the radiator, the nonradiative (conductive and convective) heat gain from the surrounding media and the incoming solar radiation during the daytime. Key properties for passive radiative cooling film include generally low emittance over the solar energy wavelengths of 0.3 microns to 2500 microns but high emittance over the atmospheric window wavelengths of 8 microns to 13 microns. According to Kirchhoff's law of thermal radiation, high absorbance correlates with high emittance.

SUMMARY

The present disclosure provides passive radiative cooling films that are suitable for use in cooling a substrate (e.g., a vehicle or building), even during daytime. The passive radiative cooling films combine highly efficient ultraviolet radiation (UV), visible radiation (VIS), and infrared (IR) reflectivity.

In a first aspect, the present disclosure provides a composite cooling film (i.e., a passive radiative composite cooling film) comprising:
an ultraviolet-reflective multilayer optical film that is at least 80 percent reflective of ultraviolet radiation over a majority of the wavelength range of at least 340 but less than 400 nanometers; and
a reflective microporous layer secured to the ultraviolet-reflective multilayer optical film, wherein the reflective microporous layer has a continuous phase comprising a nonfluorinated organic polymer and is diffusely reflective of solar radiation over a majority the wavelength range of 400 to 2500 nanometers, inclusive,
wherein the composite cooling film has an average absorbance over the wavelength range 8-13 microns of at least 0.85.

In another aspect, the present disclosure provides an article comprising a composite cooling film according to the present disclosure.

Definitions

As used herein:
"fluoropolymer" refers to any organic polymer containing fluorine;
"infrared" (IR) refers to infrared electromagnetic radiation having a wavelength of >700 nm to 1 mm, unless otherwise indicated;
"visible" (VIS) refers to visible electromagnetic radiation having a wavelength to from 400 nm to 700 nm, inclusive, unless otherwise indicated;
"ultraviolet" (UV) refers to ultraviolet electromagnetic radiation having a wavelength of at least 250 nm and up to but not including 400 nm, unless otherwise indicated;
"microporous" means having internal porosity (continuous and/or discontinuous) having average pore diameters of 50 to 10,000 nm;
"micro-voided" means having internal discrete voids having an average void diameter of 50 to 10,000 nm;
"nonfluorinated" mean not containing fluorine;
"radiation" means electromagnetic radiation unless otherwise specified;
"secured to" means directly or indirectly affixed to (e.g., in direct contact with, or adhesively bonded to by a unitary layer of adhesive);
"average reflectance" means reflectance averaged over a specified wavelength range;
"reflective" and "reflectivity" refer to the property of reflecting light or radiation, especially reflectance as measured independently of the thickness of a material; and
"reflectance" is the measure of the proportion of light or other radiation striking a surface at normal incidence which is reflected off it. Reflectivity typically varies with wavelength and is reported as the percent of incident light that is reflected from a surface (0 percent—no reflected light, 100—all light reflected. Reflectivity, and reflectance are used interchangeably herein.

Absorbance can be measured with methods described in ASTM E903-12 "Standard Test Method for Solar Absorptance, Reflectance, and Transmittance of Materials Using Integrating Spheres". Absorbance measurements described herein were made by making transmission measurements as previously described and then calculating absorbance using Equation 1, hereinbelow.

As used herein, the term "absorbance" refers to the base 10 logarithm of a ratio of incident radiant power to transmitted radiant power through a material. The ratio may be described as the radiant flux received by the material divided by the radiant flux transmitted by the material. Absorbance (A) may be calculated based on transmittance (T) according to Equation 1:

$$A = -\log_{10} T \tag{1}$$

Emissivity can be measured using infrared imaging radiometers with methods described in ASTM E1933-14 (2018)

"Standard Practice for Measuring and Compensating for Emissivity Using Infrared Imaging Radiometers."

BRIEF DESCRIPTION OF THE DRAWINGS

FIG. 4A shows a perspective view of a cross section relative to xyz-axes. FIG. 4C shows the cross section of FIG. 4A in an xz-plane. FIG. 4B shows another cross section in a yz-plane.

Figure 1:
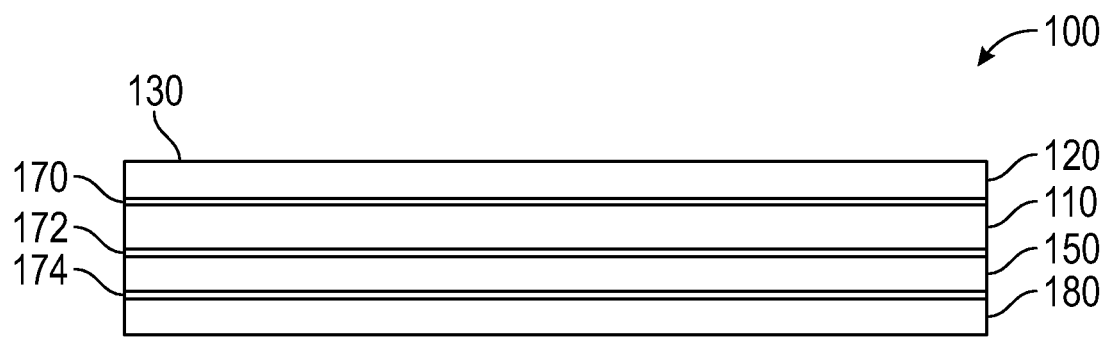
FIG. 1 is a schematic side view of an exemplary composite cooling film 100 according to one embodiment of the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

In one exemplary embodiment, shown in FIG. 1, exemplary composite cooling film 100 comprises an ultraviolet-reflective (UV-reflective) multilayer optical film 120 with a reflective microporous layer 110 secured thereto. UV-reflective multilayer optical film 120 has an optional outwardly facing skin layer 130 opposite the reflective microporous layer 110. Optional infrared-reflective (IR-reflective) layer 150 is secured to reflective microporous layer 110 opposite UV-reflective multilayer optical film 120. Optional adhesive layers 170, 172 may adhere various components together as shown in FIG. 1. Optional adhesive layer 174 may be releasably bonded to optional liner 180. In one embodiment, after removal of optional liner 180, optional adhesive layer 174 may be bonded to a substrate (e.g., a vehicle or building, not shown) to be cooled.

Figure 2:
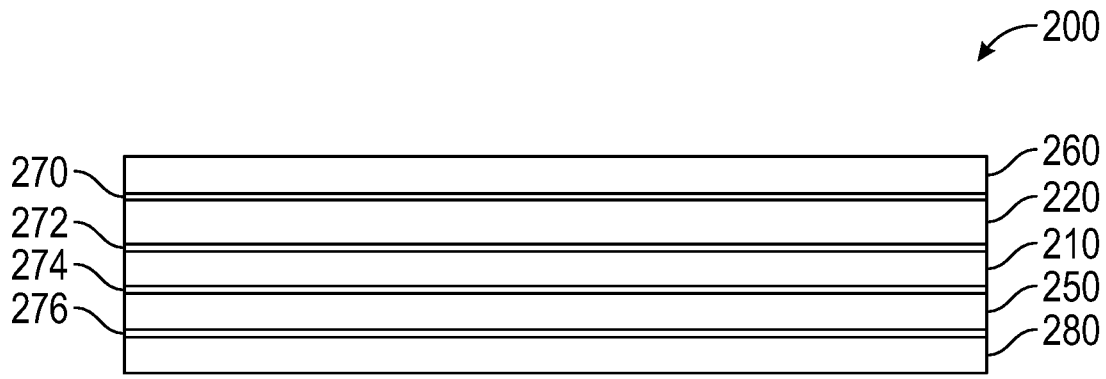
FIG. 2 is a schematic side view of an exemplary composite cooling film 200 according to one embodiment of the present disclosure.

In another exemplary embodiment, shown in FIG. 2, composite cooling film 200 comprises an ultraviolet-reflective (UV-reflective) multilayer optical film 220 with a reflective microporous layer 210 secured thereto. Optional anti-soiling film 260 is secured to UV-reflective multilayer optical film 220 opposite reflective microporous layer 210. Optional infrared-reflective (IR-reflective) layer 250 is secured to reflective microporous layer 210 opposite UV-reflective multilayer optical film 220. Optional adhesive layers 270, 272, 274 may adhere various components together as shown in FIG. 2. Optional adhesive layer 276 may be releasably bonded to optional liner 280. In one embodiment, after removal of optional liner 280, optional adhesive layer 276 may be bonded to a substrate (e.g., a vehicle or building, not shown) to be cooled.

Composite cooling films according to the present disclosure may have an average absorbance over the wavelength range 8-13 microns of at least 0.85, preferably at least 0.90, and more preferably at least 0.95.

UV-Reflective Multilayer Optical Film

UV-reflective multilayer optical film 120 is at least 50 percent reflective of ultraviolet radiation (i.e., at normal incidence) over a majority of wavelengths in the range of at least 340 but less than 400 nanometers. In some embodiments, the ultraviolet-reflective multilayer optical film is at least 60 percent, at least 70 percent, at least 75 percent, at least 80 percent, at least 85 percent, at least 90 percent, at least 95 percent, or even at least 98 percent reflective (i.e., at normal incidence) of ultraviolet radiation (i.e., at normal incidence) over a majority of wavelengths in the range of at least 340 but less than 400 nanometers. This reflectivity serves to reduce ultraviolet radiation damage to the reflective microporous layer, especially layers comprising polyethylene terephthalate (PET) polyester.

UV-reflective multilayer optical film 120 serves an important function of protecting the reflective microporous layer 110 from photodegradation (e.g., by sunlight). Many UV-reflective multilayer optical films are known in the art. Such UV-reflective MOFs generally comprise alternating layers of different polymers with different refractive indexes and appropriate layer thicknesses.

Figure 3:
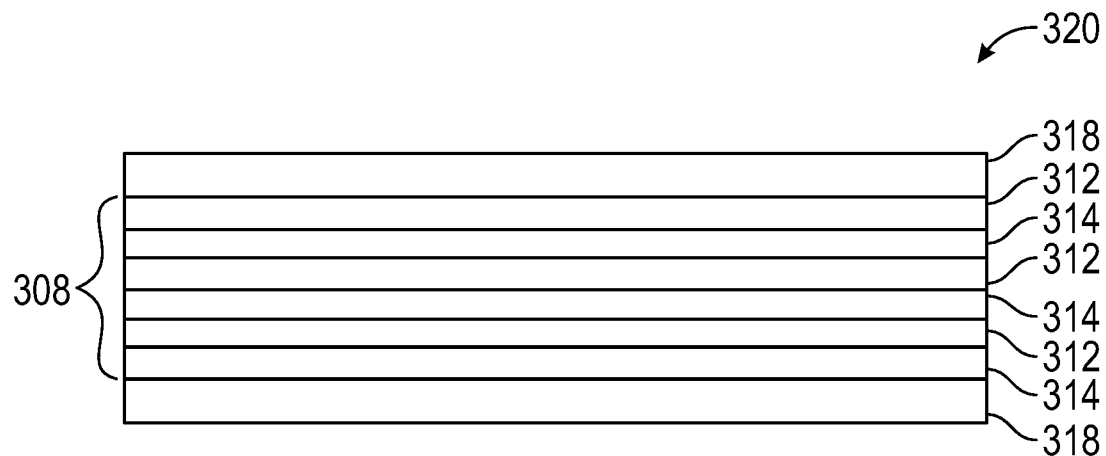
FIG. 3 is a schematic side view of an exemplary UV-reflective multilayer optical film 320.

FIG. 3 shows an exemplary UV-reflective multilayer optical film 320, which may also be used as a reflective mirror for visible, and/or infrared wavelengths depending on the configuration of the optical layers. UV-reflective multilayer optical film 320 includes one or more first optical layers 312, one or more second optical layers 314, and optionally one or more UV/VIS transparent additional skin layers 318.

UV-reflective multilayer optical film 320 includes a multilayer optical stack 308 having alternating layers 312, 314 of at least two materials, typically comprising different polymers. An in-plane index of refraction n1 in one in-plane direction of high refractive index layer 312 is higher than the in-plane index of refraction n2 of low refractive index layer 314 in the same in-plane direction. The difference in refractive index at each boundary between layers 312, 314 causes part of the incident light to be reflected. The transmission and reflection characteristics of multilayer optical film 320 is based on coherent interference of light caused by the refractive index difference between layers 312, 314 and the thicknesses of layers 312, 314. When the effective indices of refraction (or in-plane indices of refraction for normal incidence) differ between layers 312, 314, the interface between adjacent layers 312, 314 forms a reflecting surface. The reflective power of the reflecting surface depends on the square of the difference between the effective indexes of refraction of the layers 312, 314 (e.g., $(n1-n2)^2$). By increasing the difference in the indices of refraction between the layers 312, 314, improved optical power (higher reflectivity), thinner films (thinner or fewer layers), and broader bandwidth performance can be achieved. The refractive index difference in one in-plane direction in an exemplary embodiment is at least about 0.05, preferably greater than about 0.10, more preferably greater than about 0.15 and even more preferably greater than about 0.20.

In some embodiments, the materials of layers 312, 314 inherently have differing indices of refraction. In another embodiment, at least one of the materials of the layers 312, 314 has the property of stress induced birefringence, such that the index of refraction (n) of the material is affected by the stretching process. By stretching multilayer optical film 320 over a range of uniaxial to biaxial orientations, films can be created with a range of reflectivities for differently oriented plane-polarized incident light.

The number of layers in the UV-reflective multilayer optical film 320 is selected to achieve the desired optical properties using the minimum number of layers for reasons of film thickness, flexibility and economy. In the case of reflective films such as mirrors, the number of layers is preferably less than about 2,000, more preferably less than about 1,000, and even more preferably less than about 750. In some embodiments, the number of layer is at least 150 or 200. In other embodiments, the number of layer is at least 250.

In some embodiments, the UV-reflective multilayer optical film 320 further comprises optional additional non-optical or optical skin layers. Optional skin layers 318 may protect the optical layers 312, 314 from damage, aid in the co-extrusion processing, and/or enhance post-processing mechanical properties. The additional skin layers 318 are often thicker than the optical layers 312, 314. The thickness of the skin layers 318 is usually at least two times, preferably at least four times, and more preferably at least ten times, the thickness of the individual optical layers 312, 314. The thickness of the skin layers 318 may be varied to make a UV-reflective multilayer optical film having a particular thickness. A tie layer (not shown) may optionally be present between the skin layer(s) and the optical layers. Further, an optional top coat may be disposed on the skin layer. Typically, one or more of the additional layers 318 are placed so that at least a portion of the light to be transmitted, polarized, and/or reflected by the optical layers 312, 314, also travels through the additional layers (i.e., the additional layers are placed in the path of light which travels through or is reflected by optical layers 312, 314). To provide a degree of antisoiling properties, one or both of the skin layers (preferably at least the outermost skin layer) comprises fluoropolymer.

UV-reflective multilayer optical film 320 comprises multiple low/high index pairs of film layers, wherein each low/high index pair of layers 312,314 has a combined optical thickness of ½ the center wavelength of the band it is designed to reflect. Stacks of such films are commonly referred to as quarterwave stacks. In some embodiments, different low/high index pairs of layers may have different combined optical thicknesses, such as where a broadband reflective optical film is desired.

The various constituent layers of UV-reflective multilayer optical film 320, whether as skin layers or optical layers, are preferably resistant to ultraviolet radiation. Many fluoropolymers are resistant to UV-radiation.

Examples of fluoropolymers that may be used include copolymers of tetrafluoroethylene (TFE), hexafluoropropylene (HFP), and vinylidene fluoride (e.g., available from 3M Company under the trade designation 3M DYNEON THV); a copolymer of TFE, HFP, vinylidene fluoride, and perfluoropropyl vinyl ether (PPVE) (e.g., available from 3M Company under the trade designation 3M DYNEON THVP); a polyvinylidene fluoride (PVDF) (e.g., 3M DYNEON PVDF 6008 from 3M Company); ethylene chlorotrifluoroethylene polymer (ECTFE) (e.g., available as HALAR 350LC ECTFE from Solvay, Brussels, Belgium); an ethylene tetrafluoroethylene copolymer (ETFE) (e.g., available as 3M DYNEON ETFE 6235 from 3M Company); perfluoroalkoxyalkane polymers (PFA); fluorinated ethylene propylene copolymer (FEP); a polytetrafluoroethylene (PTFE); copolymers of TFE, HFP, and ethylene (HTE) (e.g., available as 3M DYNEON HTE1705 from 3M Company). Combinations of fluoropolymers can also be used. In some embodiments, the fluoropolymer includes FEP. In some embodiments, the fluoropolymer includes PFA.

Examples of non-fluorinated polymers that may be used in at least one layer of UV-reflective multilayer optical film 320 include at least one of: polypropylene, polyethylene, polyethylene copolymers, polyethylene methacrylate copolymers, ethylene vinyl acetate copolymers, polymethyl methacrylate, methyl methacrylate copolymers (e.g., copolymers of ethyl acrylate and methyl methacrylate), polyurethanes, extended chain polyethylene polymers (ECPEs), or a combinations thereof. In general, combinations of non-fluorinated polymers can be used.

Exemplary nonfluorinated polymers, especially for use in high refractive index optical layers, may include homopolymers of polymethyl methacrylate (PMMA), such as those available as CP71 and CP80 from Ineos Acrylics, Inc., Wilmington, Delaware; and polyethyl methacrylate (PEMA), which has a lower glass transition temperature than PMMA. Additional useful polymers include: copolymers of methyl methacrylate such as, for example, a copolymer made from 75 wt. % methyl methacrylate and 25 wt. % ethyl acrylate, for example, as available from Ineos Acrylics, Inc. as PERSPEX CP63, or as available from Arkema, Philadelphia, Pennsylvania as ALTUGLAS 510, and copolymers of methyl methacrylate monomer units and n-butyl methacrylate monomer units.

Blends of PMMA and PVDF may also be used.

Suitable triblock acrylic copolymers are available, for example, as KURARITY LA4285 from Kuraray America Inc., Houston, Texas Additional suitable polymers for the optical layers, especially for use in the refractive index optical layers, may include at least one of: polyolefin copolymers such as poly(ethylene-co-octene) (e.g., available as ENGAGE 8200 from Dow Elastomers, Midland, Michigan), polyethylene methacrylate (e.g., available as ELVALOY from Dow Elastomers), poly (propylene-co-ethylene) (e.g., available as Z9470 from Atofina Petrochemicals, Inc., Houston, Texas); and a copolymer of atactic polypropylene and isotactic polypropylene. Materials may be selected based on absorbance or transmittance properties described herein, as well as on refractive index. In general, the greater the refractive index between two materials, the thinner the film can be, which may be desirable for efficient heat transfer.

Multilayer optical films (including reflective polarizers and mirrors) can be made by coextrusion of alternating polymer layers having different refractive indices, for example, as described in U.S. Pat. No. 5,882,774 (Jonza et al.); U.S. Pat. No. 6,045,894 (Jonza et al.); U.S. Pat. No. 6,368,699 (Gilbert et al.); U.S. Pat. No. 6,531,230 (Weber et al.); U.S. Pat. No. 6,667,095 (Wheatley et al.); U.S. Pat. No. 6,783,349 (Neavin et al.); U.S. Pat. No. 7,271,951 B2 (Weber et al); U.S. Pat. No. 7,632,568 (Padiyath et al.); U.S. Pat. No. 7,652,736 (Padiyath et al.); and U.S. Pat. No. 7,952,805 (McGurran et al.); and PCT Publications WO 95/17303 (Ouderkirk et al.) and WO 99/39224 (Ouderkirk et al.).

In one preferred embodiment, the UV-reflective multilayer optical film reflects a wavelength range from 340 to 400 nanometers made with 150 high refractive index layers comprising a methyl methacrylate copolymer (CoPMMA) (e.g., available as PERSPEX CP63 from Lucite International, Cordova, Tennessee) alternating with 150 low refractive index layer comprising a fluoropolymer (e.g., available as 3M DYNEON THV221 from 3M Company).

Reflective Microporous Layer

The reflective microporous layer may comprise a network of interconnected voids and/or discrete voids, which may be spherical, oblate, or some other shape. Primary functions of the reflective microporous layer include reflecting at least a portion of visible and infrared radiation of the solar spectrum and to emit thermal radiation in the atmospheric window (i.e., wavelengths of 8 to 14 microns).

Accordingly, the reflective microporous layer has voids that are of appropriate size that they diffusely reflect wavelengths in the 400 to 2500 nm wavelength range. Generally, this means that the void sizes should be in a size range (e.g., 100 to 3000 nm). Preferably, a range of void sizes corresponding to those dimensions is present so that effective broadband reflection will be achieved. As used herein the term "polymer" includes synthetic and natural organic polymers (e.g., cellulose and its derivatives).

Reflectivity of the reflective microporous layer is generally a function of the number of polymer film/void interfaces, since reflection (typically diffuse reflection) occurs at those locations. Accordingly, the porosity and thickness of the reflective microporous layer will be important variable. In general, higher porosity and higher thickness correlate with higher reflectivity. However, for cost considerations film thickness is preferably minimized, although this is not a requirement. Accordingly, the thickness of the reflective microporous layer is typically in the range of 10 microns to 500 microns, preferably in the range of 10 microns to 200 microns, although this is not a requirement. Likewise, the porosity of the reflective microporous layer is typically in the range of 10 volume percent to 90 volume percent, preferably in the range of 20 volume percent to 85 volume percent, although this is not a requirement.

Microporous polymer films suitable for use as the reflective microporous layer are known in the art and are described, for example, in U.S. Pat. No. 8,962,214 (Smith et al.) entitled "Microporous PVDF Films", in U.S. Pat. No. 10,240,013 (Mrozinski et al.) entitled "Microporous Material from Ethylene-Chlorotrifluoroethylene Copolymer and Method for Making Same", and in U.S. Pat. No. 4,874,567 (Lopatin et al.) entitled "Microporous Membranes from Polypropylene". These films may have average pore diameters of at least 0.05 microns.

In certain embodiments, the reflective microporous layer includes at least one Thermally Induced Phase Separation (TIPS) material. The pore size of TIPS materials can be generally controlled due to the ability to select the extent of stretching of the layer. TIPS materials are relatively inexpensive to make, and methods for making them are known to the skilled practitioner. For example, various materials and methods are described in detail in U.S. Pat. No. 4,726,989 (Mrozinski), U.S. Pat. No. 5,238,623 (Mrozinski), U.S. Pat. No. 5,993,954 (Radovanovic et al.), and U.S. Pat. No. 6,632,850 (Hughes et al.). reflective microporous layers for use in aspects of the present disclosure also include Solvent Induced Phase Separated (SIPS) materials (e.g., U.S. Pat. No. 4,976,859 (Wechs)) and other reflective microporous layers made by extrusion, extrusion/stretching and extrusion/stretching/extraction processes. Suitable reflective microporous layers that may be formed by SIPS include for example and without limitation polyvinylidene fluoride (PVDF), polyether sulfone (PES), polysulfone (PS), polyacrylonitrile (PAN), nylon (i.e., polyamide), cellulose acetate, cellulose nitrate, regenerated cellulose, and polyimide. Suitable reflective microporous layers that may be formed by stretching techniques (e.g., U.S. Pat. No. 6,368,742 (Fisher et al.)) include for example and without limitation polytetrafluoroethylene (PTFE) and polypropylene.

In certain embodiments, the reflective microporous layer comprises a thermoplastic polymer, for instance polyethylene, polypropylene, 1-octene, styrene, polyolefin copolymer, polyamide, poly-1-butene, poly-4-methyl-1-pentene, polyethersulfone, ethylene tetrafluoroethylene, polyvinylidene fluoride, polysulfone, polyacrylonitrile, polyamide, cellulose acetate, cellulose nitrate, regenerated cellulose, polyvinyl chloride, polycarbonate, polyethylene terephthalate, polyimide, polytetrafluoroethylene, ethylene chlorotrifluoroethylene, or combinations thereof.

Materials suitable for use as the reflective microporous layer include nonwoven fibrous layers.

Polymeric nonwoven layers can be made using a melt blowing process. Melt blown nonwoven fibrous layers can contain very fine fibers. In melt-blowing, one or more thermoplastic polymer streams are extruded through a die containing closely arranged orifices. These polymer streams are attenuated by convergent streams of hot air at high velocities to form fine fibers, which are then collected on a surface to provide a melt-blown nonwoven fibrous layer. Depending on the operating parameters chosen, the collected fibers may be semi-continuous or essentially discontinuous.

Polymeric nonwoven layers can also be made by a process known as melt spinning. In melt spinning, the nonwoven fibers are extruded as filaments out of a set of orifices and allowed to cool and solidify to form fibers. The filaments are passed through an air space, which may contain streams of moving air, to assist in cooling the filaments and passing through an attenuation (i.e., drawing) unit to at least partially draw the filaments. Fibers made through a melt spinning process can be "spunbonded," whereby a web comprising a set of melt-spun fibers are collected as a fibrous web and optionally subjected to one or more bonding operations to fuse the fibers to each other. Melt-spun fibers are generally larger in diameter than melt-blown fibers.

Polymers suitable for use in a melt blown or melt spinning process include polyolefins such as polypropylene and polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinyl acetate, polyacrylonitrile, cyclic polyolefin, and copolymers and blends thereof. In some embodiments, the polymer, copolymer, or blend thereof represents at least 35% of the overall weight of the directly formed fibers present in the nonwoven fibrous layer.

Nonwoven fibers can be made from a thermoplastic semi-crystalline polymer, such as a semi-crystalline polyester. Useful polyesters include aliphatic polyesters. Nonwoven materials based on aliphatic polyester fibers can be especially advantageous in resisting degradation or shrinkage at high temperature applications. This property can be achieved by making the nonwoven fibrous layer using a melt blowing process where the melt blown fibers are subjected to a controlled in-flight heat treatment operation immediately upon exit of the melt blown fibers from the multiplicity of orifices. The controlled in-flight heat treatment operation takes place at a temperature below a melting temperature of the portion of the melt blown fibers for a time sufficient to achieve stress relaxation of at least a portion of the molecules within the portion of the fibers subjected to the controlled in-flight heat treatment operation. Details of the in-flight heat treatment are described in U.S. Pat. Appl. Publ. No. 2016/0298266 (Zillig et al.).

Nonwoven fibrous layers that may be used for the reflective microporous layer include ones made using an air laid process, in which a wall of air blows fibers onto a perforated collection drum having negative pressure inside the drum. The air is pulled though the drum and the fibers are collected on the outside of the drum where they are removed as a web.

Exemplary embodiments of microporous membrane fabricated with nonwoven fibers are highly reflective white papers comprising polysaccharides. Micro-porous polysaccharide white papers having greater than 90% reflectance over visible wavelengths of 400 to 700 nm are available from International Paper, Memphis, Tennessee, under the trade designations IP ACCENT OPAQUE DIGITAL (100 lbs), IP ACCENT OPAQUE DIGITAL (100 lbs), HAMMERMILL PREMIUM COLOR COPY (80 lbs), and HAMMERMILL PREMIUM COLOR COPY (100 lbs). Titania, $BaSO_4$ and other white pigments are often added to paper to increase their reflection of visible light (400-700 nm).

Other nonwoven fibrous layers that may be used for the reflective microporous layer include those made using a wet laid process. A wet laying or "wetlaid" process comprises (a) forming a dispersion comprising one or more types of fibers, optionally a polymeric binder, and optionally a particle filler(s) in at least one dispersing liquid (preferably water); and (b) removing the dispersing liquid from the dispersion.

Suitable fibers for use in air laid and wet laid processes include those made from natural (animal or vegetable) and/or synthetic polymers, including thermoplastic and solvent-dispersible polymers. Useful polymers include wool; silk; cellulosic polymers (e.g., cellulose and cellulose derivatives); fluorinated polymers (e.g., polyvinyl fluoride, polyvinylidene fluoride, copolymers of vinylidene fluoride such as poly(vinylidene fluoride-co-hexafluoropropylene), and copolymers of chlorotrifluoroethylene such as poly(ethylene-co-chlorotrifluoroethylene)); chlorinated polymers; polyolefins (e.g., polyethylene, polypropylene, poly-1-butene, copolymers of ethylene and/or propylene, with 1-butene, 1-hexene, 1-octene, and/or 1-decene (e.g., poly(ethylene-co-1-butene), poly(ethylene-co-1-butene-co-1-hexene)); polyisoprenes, polybutadienes; polyamides (e.g., nylon 6, nylon 6,6, nylon 6,12, poly(iminoadipoyliminohexarethylene), poly(iminoadipoyliminodecancthylene), or polycaprolactam), polyimides (e.g., poly(pyromellitimide)); polyethers; polyether sulfones (e.g., poly(diphenyl ether sulfone), or poly(diphenyl sulfone-co-diphenylene oxide sulfone)); polysulfones; polyvinyl acetates; copolymers of vinyl acetate (e.g., poly(ethylene-co-vinyl acetate), copolymers in which at least some of the acetate groups have been hydrolyzed to provide various poly(vinyl alcohols) including poly(ethylene-co-vinyl alcohol)); polyphosphazenes; polyvinyl esters; polyvinyl ethers; poly(vinyl alcohols); polyaramids (e.g., para-aramids such as poly(paraphenylene terephthalamide) and fibers sold under the trade designation KEVLAR by DuPont Co., Wilmington, Delaware pulps of which are commercially available in various grades based on the length of the fibers that make up the pulp such as, e.g., KEVLAR 1F306 and KEVLAR 1F694, both of which include aramid fibers that are at least 4 mm in length); polycarbonates; and combinations thereof. Nonwoven fibrous layers may be calendered to adjust the pore size.

The use of a reflective micro-voided polymer film as the reflective microporous layer may provide a reflectance that is even greater than that of a silvered mirror. In some embodiments, a reflective micro-voided polymer film reflects a maximum amount of solar energy in a range from 400 to 2500 nanometers (nm). In particular, the use of a fluoropolymer blended into the micro-voided polymer film may provide a reflectance that is greater than other conventional multilayer optical films. Further, inorganic particles including barium sulfate, calcium carbonate, silica, alumina, aluminum silicate, zirconia, and titania may be blended into the micro-voided polymer film for providing high solar reflectance in solar radiation spectra of 0.4 to 2.5 microns and high absorbance in the atmospheric window of 8 to 13 microns. In some embodiments, the article may form part of a cooling panel that may be disposed on the exterior of at least part of a building or a heat transfer system. The heat transfer system can cool a fluid, liquid or gas, which can then be used to remove heat from a building or vehicle, including an electric vehicle battery. The outer layer may be suitable for protecting the reflective microporous layer, particularly, in outdoor environments. Including the outer layer may also facilitate less soiling of the surface and ease of cleaning the surface.

Exemplary polymers useful for forming the reflective micro-voided polymer film include polyethylene terephthalate (PET) available from 3M Company. Modified PET copolyesters including PETG available, for example, as SPECTAR 14471 and EASTAR GN071 from Eastman Chemical Company, Kingsport, Tennessee, and PCTG available, for example, as TIGLAZE ST and EB0062 also from Eastman Chemical Company are also useful high refractive index polymers. The molecular orientation of PET and PET modified copolyesters may be increased by stretching which increases its in-plane refractive indices providing even more reflectivity in the multilayer optical film. In general, an incompatible polymer additive, or inorganic particle additive, is blended into the PET host polymer at levels of at least 10 wt. %, at least 20 wt. %, at least 30 wt. %, at least 40 wt. %, or even at least 49 wt. % during extrusion prior to stretching to nucleate voids during the stretching process. Suitable incompatible polymers additives for PET include: fluoropolymers, polypropylenes, polyethylenes, and other polymers which do not adhere well to PET. Similarly, if polypropylene is the host polymer, then incompatible polymer additives such as PET or fluoropolymers can be added to the polypropylene host polymer at levels of at least 10 wt. %, at least 20 wt. %, at least 30 wt. %, at least 40 wt. %, or even at least 49 wt. % during extrusion prior to stretching to nucleate voids during the stretching process. Exemplary suitable inorganic particle additives for nucleating voids in micro-voided polymer films include titania, silica, alumina, aluminum silicate, zirconia, calcium carbonate, barium sulfate, and glass beads and hollow glass bubbles, although other inorganic particles and combinations of inorganic particles may also be used. Crosslinked polymeric micro-spheres can also be used instead of inorganic particles. Inorganic particles can be added to the host polymer at levels of at least 10 wt. %, at least 20 wt. %, at least 30 wt. %, at least 40 wt. %, or even at least 49 wt. % during extrusion prior to stretching to nucleate voids during the stretching process. If present, the inorganic particles preferably have a volume average particle diameter of 5 nm to 1 micron, although other particle sizes may also be used. Hard particles including glass beads and/or glass bubbles can be present on the surface layer of UV mirror skin layer or the antisoiling layer to provide scratch resistance. In some embodiments, glass beads and/or glass bubbles may even protrude from the surface as hemispheres or even quarter spheres.

In some embodiments, micro-voided polymer films comprise a fluoropolymer continuous phase. Exemplary suitable polymers include ECTFE, PVDF, and copolymers of tetrafluoroethylene, hexafluoropropylene, and vinylidene fluoride such as, for example, those available under the trade designation THV from 3M Company.

Exemplary micro-voided PET film comprising barium sulfate is available as LUMIRROR XJSA2 from Toray Plastics (America) Inc., North Kingstown, Rhode Island LUMIRROR XJSA2 comprises $BaSO_4$ inorganic additive to increase its reflectivity of visible light (400-700 nm). Additional exemplary reflective micro-voided polymer films are available from Mitsubishi Polymer Film, Inc., Greer, South Carolina, as HOSTAPHAN V54B, HOSTAPHAN WDI3, and HOSTAPHAN W270.

Exemplary micro-voided polyolefin films are described in, for example, U.S. Pat. No. 6,261,994 (Bourdelais et al.).

The reflective microporous layer is diffusely reflective, for example, of visible radiation over a majority of wavelengths in the range of 400 to 700 nanometers, inclusive. In some embodiments, the reflective microporous layer may have an average reflectance of at least 85% (in some embodiments, at least 90%, at least 91%, at least 92%, at least 93%, at least 94%, at least 95%, at least 96%, at least 97%, at least 98%, at least 99%, or even at least 99.5%) over a wavelength range of at least 400 nm up to 700 nm.

The reflectivity of the reflective microporous layer may be reflective over a broader wavelength range. Accordingly, in some embodiments, the reflectivity of the microporous polymer layer may have an average reflectance of at least 85% (in some embodiments, at least 90%, at least 91%, at least 92%, at least 93%, at least 94%, at least 95%, at least 96%, at least 97%, at least 98%, at least 99%, or even at least 99.5%) over a wavelength range of at least 400 nm up to 2.5 micrometers, preferably at least 300 nm to 3.0 micrometers, although this is not a requirement.

Optional Antisoiling Layer

The composite cooling film may include an optional antisoiling layer, which may be an outward facing skin layer of the UV-reflective multilayer optical film, a separate film secured to the UV-reflective multilayer optical film (e.g., by adhesive), or a coating thereon that provides a degree of protection from soil accumulation on the surface that could impede the function of the composite cooling film (e.g., by absorbing solar radiation).

In some embodiments the optional antisoiling layer is a polymer film, preferably comprising one or more repellent polymers such as, for example, fluoropolymers. Examples of comonomers for making fluoropolymers that may be used include TFE, HFP, THV, PPVE. Exemplary fluoropolymers for use as the antisoiling layer include PVDF, ECTFE, ETFE, PFA, FEP, PTFE, HTE, and combinations thereof. In some embodiments, the fluoropolymer includes FEP. In some embodiments, the fluoropolymer includes PFA.

In some embodiments, the antisoiling layer is applied as a coating onto the UV-reflective multilayer optical film. Numerous applied antisoiling compositions are know in the art including, for example, those described in U.S Pat. Appln. Pubs. 2015/0175479 (Brown et al.), 2005/0233070 (Pellerite et al.), U.S. Pat. No. 6,277,485 (Invie et al.), and WO 02/12404 (Liu et al.) In some embodiments, the outward facing surface of the optional antisoiling layer (i.e., opposite the reflective microporous layer) may be microstructured and/or nanostructured over some or all of its surface; for example, as described in PCT International Application No. PCT/IB2018/060527, filed Dec. 21, 2018 and entitled "ANTI-REFLECTIVE SURFACE STRUCTURES".

In some embodiments, the nanostructure may be superimposed on the microstructure on the surface of the antisoiling layer.

The antisoiling layer has a major surface (i.e., an antisoiling surface) that includes micro-structures and/or nano-structures. The micro-structures may be arranged as a series of alternating micro-peaks and micro-spaces. The size and shape of the micro-spaces between micro-peaks may mitigate the adhesion of dirt particles to the micro-peaks. The nano-structures may be arranged as at least one series of nano-peaks disposed on at least the micro-spaces. The micro-peaks may be more durable to environmental effects than the nano-peaks. Because the micro-peaks are spaced only by a micro-space, and the micro-spaces are significantly taller than the nano-peaks, the micro-peaks may serve to protect the nano-peaks on the surface of the micro-spaces from abrasion.

In reference to the antisoiling layer, the term or prefix "micro" refers to at least one dimension defining a structure or shape being in a range from 1 micrometer to 1 millimeter. For example, a microstructure may have a height or a width that is in a range from 1 micrometer to 1 millimeter.

As used herein, the term or prefix "nano" refers to at least one dimension defining a structure or a shape being less than 1 micrometer. For example, a nano-structure may have at least one of a height or a width that is less than 1 micrometer.

Figure 4A:
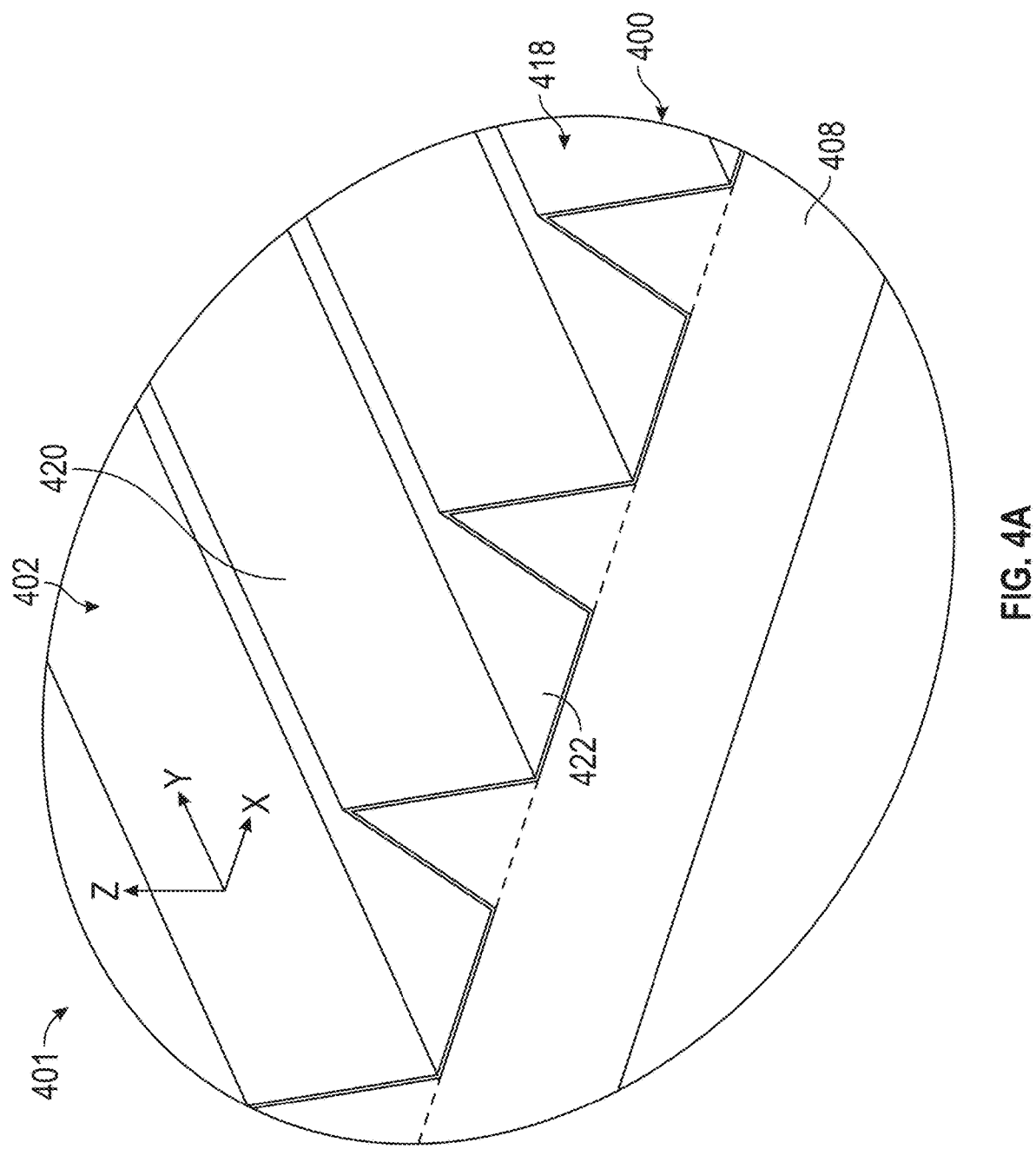
FIGS. 4A, 4B, and 4C are views of an anti-reflective surface structure having micro-structures.
Figure 4B:
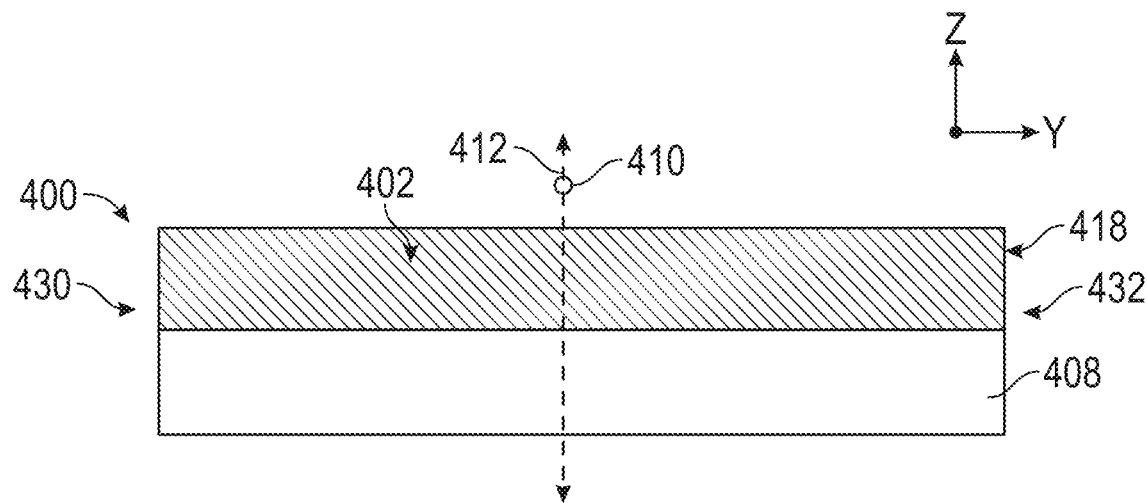
Figure 4C:
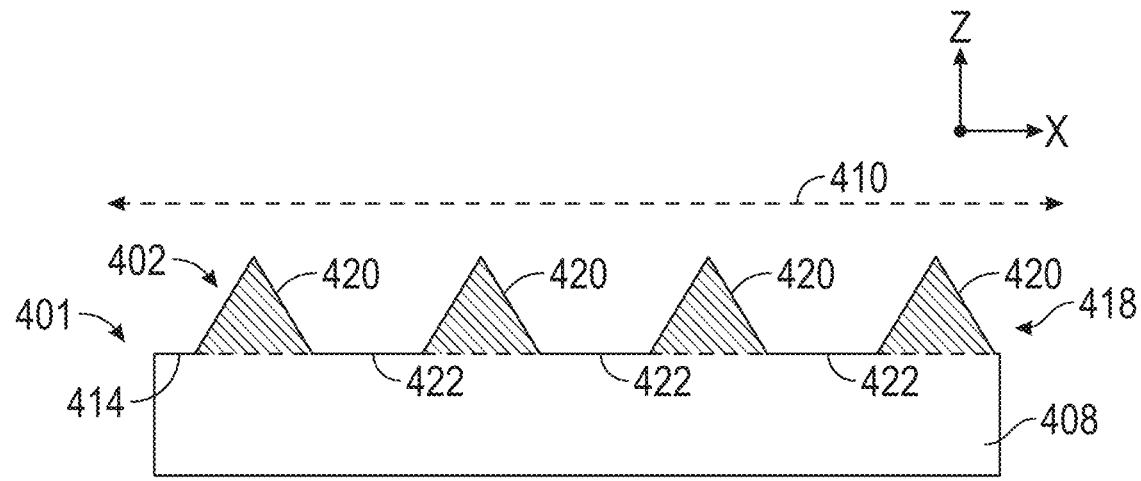

FIGS. 4A, 4B, and 4C show cross-sections 400, 401 of an antisoiling surface structure, shown as antisoiling layer 408 having antisoiling surface 402 defined by a series of micro-structures 418. In particular, FIG. 4A shows a perspective view of the cross section 401 relative to xyz-axes. FIG. 4C shows cross section 401 in an xz-plane parallel to axis 410. FIG. 4B shows cross section 400 in a yz-plane orthogonal to cross section 401 and orthogonal to axis 410. Antisoiling surface 402 is depicted in FIGS. 4A-4C as if antisoiling layer 408 were lying on a flat horizontal surface. Antisoiling layer 408, however, may be flexible and may conform to substrates that are not flat.

In some embodiments, micro-structures 418 are formed in antisoiling layer 408. Micro-structures 418 and remaining portions of antisoiling layer 408 below the micro-structures may be formed of the same material. Antisoiling layer 408 may be formed of any suitable material capable of defining micro-structures 418, which may at least partially define antisoiling surface 402. Antisoiling layer 408 may be transparent to various frequencies of light. In at least one embodiment, antisoiling layer 408 may be non-transparent, or even opaque, to various frequencies of light. In some embodiments, Antisoiling layer 408 may include an UV stable material. In some embodiments, antisoiling layer 408 may include a polymer material such as a fluoropolymer or a polyolefin polymer.

Antisoiling surface 402 may extend along axis 410, for example, parallel or substantially parallel to the axis. Plane 412 may contain axis 410, for example, parallel or intersecting such that axis 410 is in plane 412. Both axis 410 and plane 412 may be imaginary constructs used herein to illustrate various features related to antisoiling surface 402. For example, the intersection of plane 412 and antisoiling surface 402 may define line 414 describing a cross-sectional profile of the surface as shown in FIG. 4C that includes micro-peaks 420 and micro-spaces 422 as described herein in more detail. Line 414 may include at least one straight segment or curved segments.

Line 414 may at least partially define series of micro-structures 418. micro-structures 418 may be three-dimensional (3D) structures disposed on antisoiling layer 408, and line 414 may describe only two dimensions (e.g., height and width) of that 3D structure. As can be seen in FIG. 4B, micro-structures 418 may have a length that extends along surface 402 from one side 430 to another side 432.

Micro-structures 418 may include a series of alternating micro-peaks 420 and micro-spaces 422 along, or in the direction of, axis 410, which may be defined by, or included in, line 414. The direction of axis 410 may coincide with a width dimension. Micro-spaces 422 may each be disposed between pair of micro-peaks 420. In other words, plurality of micro-peaks 420 may be separated from one another by at least one micro-spaces 422. In at least one embodiments, at least one pair of micro-peaks 420 may not include micro-space 422 in-between. Pattern of alternating micro-peaks 420 and micro-spaces 422 may be described as a "skipped tooth riblet" (STR). Each of micro-peaks 420 and micro-spaces 422 may include at least one straight segment or curved segment.

A slope of line 414 (e.g., rise over run) may be defined relative to the direction of axis 410 as an x-coordinate (run) and relative to the direction of plane 412 as a y-axis (rise).

A maximum absolute slope may be defined for at least one portion of line 414. As used herein, the term "maximum absolute slope" refers to a maximum value selected from the absolute value of the slopes throughout a particular portion of line 414. For example, the maximum absolute slope of one micro-space 422 may refer to a maximum value selected from calculating the absolute values of the slopes at every point along line 414 defining the micro-space.

A line defined the maximum absolute slope of each micro-space 422 may be used to define an angle relative to axis 410. In some embodiments, the angle corresponding to the maximum absolute slope may be at most 30 (in some embodiments, at most 25, 20, 15, 10, 5, or even at most 1) degrees. In some embodiments, the maximum absolute slope of at least some (in some embodiments, all) of micro-peaks 420 may be greater than the maximum absolute slope of at least some (in some embodiments, all) of micro-spaces 422.

In some embodiments, line 414 may include boundary 416 between each adjacent micro-peak 420 and micro-space 422. Boundary 416 may include at least one of straight segment or curved segment. Boundary 416 may be a point along line 414. In some embodiments, boundary 416 may include a bend. The bend may include the intersection of two segments of line 414. The bend may include a point at which line 414 changes direction in a locale (e.g., a change in slope between two different straight lines). The bend may also include a point at which line 414 has the sharpest change in direction in a locale (e.g., a sharper turn compared to adjacent curved segments). In some embodiments, boundary 416 may include an inflection point. An inflection point may be a point of a line at which the direction of curvature changes.

Figure 5:
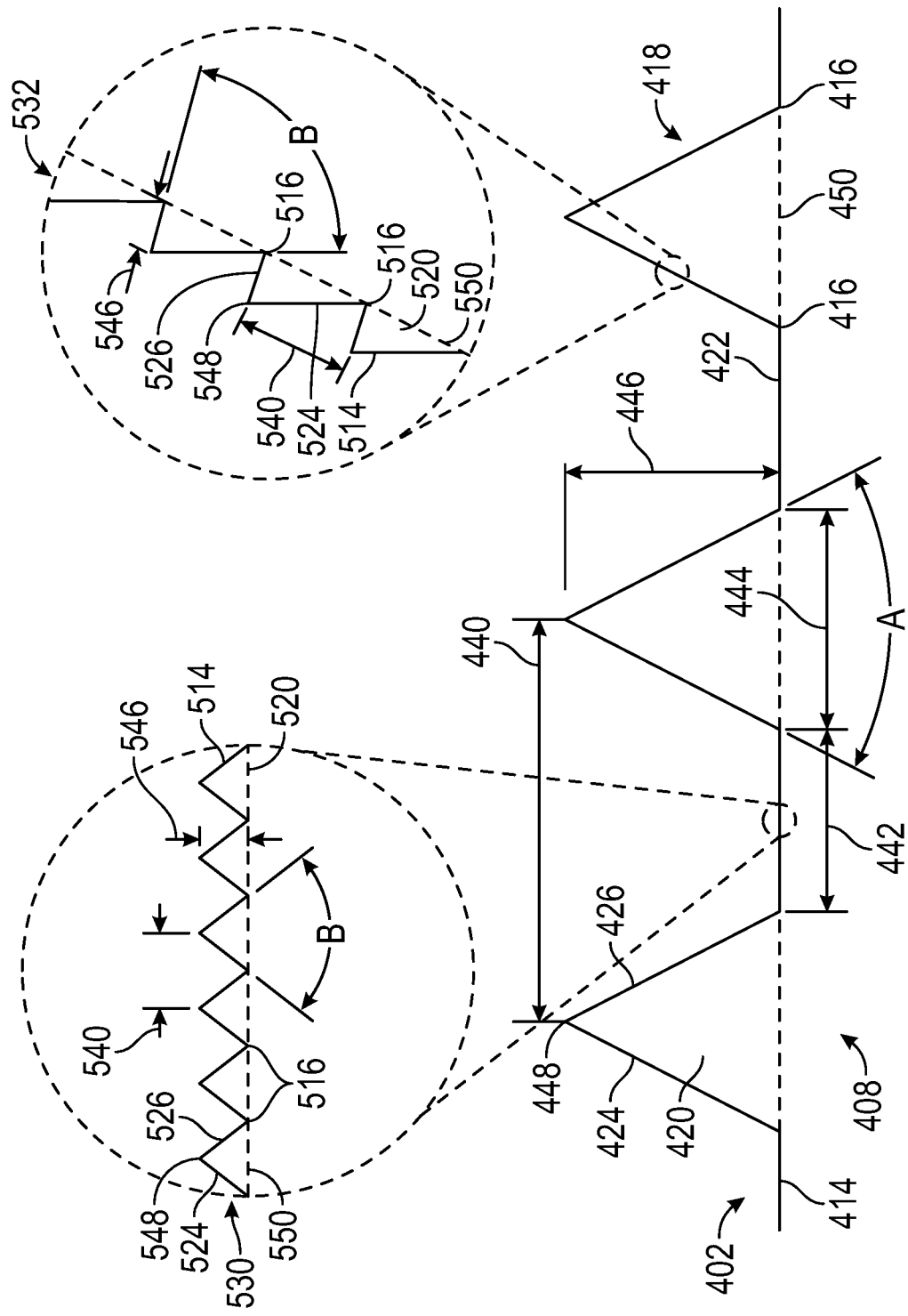
FIG. 5 is a cross-sectional illustration of various nano-structures of the anti-reflective surface structure of FIGS. 4A-4C in an xz-plane.

FIG. 5 shows antisoiling surface 402 of antisoiling layer 408 with nano-structures 530, 532, which are visible in two magnified overlays. At least one micro-peak 420 may include at least one first micro-segment 424 or at least one second micro-segment 426. Micro-segments 424, 426 may be disposed on opposite sides of apex 448 of micro-peak 420. Apex 448 may be, for example, the highest point or local maxima of line 414. Each micro-segment 424, 426 may include at least one: straight segment or curved segment.

Line 414 defining first and second micro-segments 424, 426 may have a first average slope and a second average slope, respectively. The slopes may be defined relative to baseline 450 as an x-axis (run), wherein an orthogonal direction is the z-axis (rise).

As used herein, the term "average slope" refers to an average slope throughout a particular portion of a line. In some embodiments, the average slope of first micro-segment 424 may refer to the slope between the endpoints of the first micro-segment. In some embodiments, the average slope of first micro-segment 424 may refer to an average value calculated from the slopes measured at multiple points along the first micro-segment.

In general, the micro-peak first average slope may be defined as positive and the micro-peak second average slope may be defined as negative. In other words, the first average slope and the second average slope have opposite signs. In some embodiments, the absolute value of the micro-peak first average slope may be equal to the absolute value of the micro-peak second average slope. In some embodiments, the absolute values may be different. In some embodiments, the absolute value of each average slope of micro-segments 424, 426 may be greater than the absolute value of the average slope of micro-space 422.

Angle A of micro-peaks 420 may be defined between the micro-peak first and second average slopes. In other words, the first and second average slopes may be calculated and then an angle between those calculated lines may be determined. For purposes of illustration, angle A is shown as relating to first and second micro-segments 424, 426. In some embodiments, however, when the first and second micro-segments are not straight lines, the angle A may not necessarily be equal to the angle between two micro-segments 424, 426.

Angle A may be in a range to provide sufficient antisoiling properties for surface 202. In some embodiments, angle A may be at most 120 (in some embodiments, at most 110, 100, 95, 90, 85, 80, 75, 70, 65, 60, 55, 50, 45, 40, 35, 30, 25, 20, or even at most 10) degrees. In some embodiments, angle A is at most 85 (in some embodiments, at most 75) degrees. In some embodiments, angle A is, at the low end, at least 30 (in some embodiments, at least 25, 40, 45, or even at least 50) degrees. In some embodiments, angle A is, at the high end, at most 75 (in some embodiments, at most 60, or even at most 55) degrees.

Micro-peaks 420 may be any suitable shape capable of providing angle A based on the average slopes of micro-segments 424, 426. In some embodiments, micro-peaks 420 are generally formed in the shape of a triangle. In some embodiments, micro-peaks 420 are not in the shape of a triangle. The shape may be symmetrical across a z-axis intersecting apex 448. In some embodiments, the shape may be asymmetrical.

Each micro-space 422 may define micro-space width 242. Micro-space width 442 may be defined as a distance between corresponding boundaries 416, which may be between adjacent micro-peaks 420.

A minimum for micro-space width 442 may be defined in terms of micrometers. In some embodiments, micro-space width 442 may be at least 10 (in some embodiments, at least 20, 25, 30, 40, 50, 60, 70, 75, 80, 90, 100, 150, 200, or even at least 250) micrometers. In some applications, micro-space width 442 is, at the low end, at least 50 (in some embodiments, at least 60) micrometers. In some applications, micro-space width 442 is, at the high end, at most 90 (in some embodiments, at most 80) micrometers. In some applications, micro-space width 442 is 70 micrometers.

As used herein, the term "peak distance" refers to the distance between consecutive peaks, or between the closest pair of peaks, measured at each apex or highest point of the peak.

Micro-space width 442 may also be defined relative to micro-peak distance 440. In particular, a minimum for micro-space width 442 may be defined relative to corresponding micro-peak distance 440, which may refer to the distance between the closest pair of micro-peaks 420 surrounding micro-space 422 measured at each apex 448 of the micro-peaks. In some embodiments, micro-space width 442 may be at least 10% (in some embodiments, at least 20%, 25%, 30%, 40%, 50%, 60%, 70%, 80%, or even at least 90%) of the maximum for micro-peak distance 440. In some embodiments, the minimum for micro-space width 442 is, at the low end, at least 30% (in some embodiments, at least 40%) of the maximum for micro-peak distance 440. In some embodiments, the minimum for micro-space width 442 is, at the high end, at most 60% (in some embodiments, at most 50%) of the maximum for micro-peak distance 440. In some embodiments, micro-space width 442 is 45% of micro-peak distance 440.

A minimum the micro-peak distance 440 may be defined in terms of micrometers. In some embodiments, micro-peak distance 440 may be at least 1 (in some embodiments, at least 2, 3, 4, 5, 10, 25, 50, 75, 100, 150, 200, 250, or even at least 500) micrometers. In some embodiments, micro-peak distance 440 is at least 100 micrometers.

A maximum for micro-peak distance 440 may be defined in terms of micrometers. Micro-peak distance 440 may be at most 1000 (in some embodiments, at most 900, 800, 700, 600, 500, 400, 300, 250, 200, 150, 100, or even at most 50) micrometers. In some embodiments, micro-peak distance 440 is, at the high end, at most 200 micrometers. In some embodiments, micro-peak distance 440 is, at the low end, at least 100 micrometers. In some embodiments, micro-peak distance 440 is 150 micrometers.

Each micro-peak 420 may define micro-peak height 446. Micro-peak height 446 may be defined as a distance between baseline 550 and apex 448 of micro-peak 420. A minimum may be defined for micro-peak height 446 in terms of micrometers. In some embodiments, micro-peak height 446 may be at least 10 (in some embodiments, at least 20, 25, 30, 40, 50, 60, 70, 80, 90, 100, 150, 200, or even at least 250) micrometers. In some embodiments, micro-peak height 446 is at least 60 (in some embodiments, at least 70) micrometers. In some embodiments, micro-peak height 446 is 80 micrometers.

Plurality of nano-structures 530, 532 may be defined at least partially by line 414. Plurality of nano-structures 530 may be disposed on at least one or micro-space 422. In particular, line 514 defining nano-structures 530 may include at least one series of nano-peaks 520 disposed on at least one micro-space 422. In some embodiments, at least one series of nano-peaks 520 of plurality of nano-structures 532 may also be disposed on at least one micro-peak 420.

Due to at least their difference in size, micro-structures 418 may be more durable than nano-structures 530, 532 in terms of abrasion resistance. In some embodiments, plurality of nano-structures 532 are disposed only on micro-spaces 422 or at least not disposed proximate to or adjacent to apex 448 of micro-peaks 420.

Each nano-peak 520 may include at least one of first nano-segment 524 and second nano-segment 526. Each nano-peak 520 may include both nano-segments 524, 526. Nano-segments 524, 526 may be disposed on opposite sides of apex 548 of nano-peak 520.

First and second nano-segments 524, 526 may define a first average slope and a second average slope, respectively, which describe line 514 defining the nano-segment. For nano-structures 530, 532, the slope of line 514 may be defined relative to baseline 550 as an x-axis (run), wherein an orthogonal direction is the z-axis (rise).

In general, the nano-peak first average slope may be defined as positive and the nano-peak second average slope may be defined as negative, or vice versa. In other words, the first average slope and the second average slope at least have opposite signs. In some embodiments, the absolute value of the nano-peak first average slope may be equal to the absolute value of the nano-peak second average slope (e.g., nano-structures 530). In some embodiments, the absolute values may be different (e.g., nano-structures 532).

Angle B of nano-peaks 520 may be defined between lines defined by the nano-peak first and second average slopes. Similar to angle A, angle B as shown is for purposes of illustration and may not necessarily equal to any directly measured angle between nano-segments 524, 526.

Angle B may be a range to provide sufficient antisoiling properties for surface 402. In some embodiments, angle B may be at most 120 (in some embodiments, at most 110, 100, 90, 85, 80, 75, 70, 65, 60, 55, 50, 45, 40, 35, 30, 25, 20, or even at most 10) degrees. In some embodiments, angle B is, at the high end, at most 85 (in some embodiments, at most 80, or even at most 75) degrees. In some embodiments, angle B is, at the low end, at least 55 (in some embodiments, at least 60, or even at least 65) degrees. In some embodiments, angle B is 70 degrees.

Angle B may be the same or different for each nano-peak 520. For example, in some embodiments, angle B for nano-peaks 520 on micro-peaks 420 may be different than angle B for nano-peaks 520 on micro-spaces 422.

Nano-peaks 520 may be any suitable shape capable of providing angle B based on lines defined by the average slopes of nano-segments 524, 526. In some embodiments, nano-peaks 520 are generally formed in the shape of a triangle. In at least one embodiments, nano-peaks 520 are not in the shape of a triangle. The shape may be symmetrical across apex 548. For example, nano-peaks 520 of nano-structures 530 disposed on micro-spaces 422 may be symmetrical. In at least one embodiments, the shape may be asymmetrical. For example, nano-peaks 520 of nano-structures 532 disposed on micro-peaks 420 may be asymmetrical with one nano-segment 524 being longer than other nano-segment 526. In some embodiments, nano-peaks 520 may be formed with no undercutting.

Each nano-peak 520 may define nano-peak height 546. Nano-peak height 546 may be defined as a distance between baseline 550 and apex 548 of nano-peak 520. A minimum may be defined for nano-peak height 546 in terms of nanometers. In some embodiments, nano-peak height 546 may be at least 10 (in some embodiments, at least 50, 75, 100, 120, 140, 150, 160, 180, 200, 250, or even at least 500) nanometers.

In some embodiments, nano-peak height 546 is at most 250 (in some embodiments, at most 200) nanometers, particularly for nano-structures 530 on micro-spaces 422. In some embodiments, nano-peak height 546 is in a range from 100 to 250 (in some embodiments, 160 to 200) nanometers. In some embodiments, nano-peak height 546 is 180 nanometers.

In some embodiments, nano-peak height 546 is at most 160 (in some embodiments, at most 140) nanometers, particularly for nano-structures 532 on micro-peaks 420. In some embodiments, nano-peak height 546 is in a range from 75 to 160 (in some embodiments, 100 to 140) nanometers. In some embodiments, nano-peak height 546 is 120 nanometers.

As used herein, the terms "corresponding micro-peak" or "corresponding micro-peaks" refer to micro-peak 420 upon which nano-peak 520 is disposed or, if the nano-peak is disposed on corresponding micro-space 422, refers to one or both of the closest micro-peaks that surround that micro-space. In other words, micro-peaks 420 that correspond to micro-space 422 refer to the micro-peaks in the series of micro-peaks that precede and succeed the micro-space.

Nano-peak height 546 may also be defined relative to micro-peak height 446 of corresponding micro-peak 420. In some embodiments, corresponding micro-peak height 446 may be at least 10 (in some embodiments, at least 50, 100, 150, 200, 300, 400, 500, 600, 700, 800, 900, or even at least 1000) times nano-peak height 546. In some embodiments, corresponding micro-peak height 446 is, at the low end, at least 300 (in some embodiments, at least 400, 500, or even at least 600) times nano-peak height 546. In some embodiments, corresponding micro-peak height 446 is, at the high end, at most 900 (in some embodiments, at most 800, or even at most 700) times nano-peak height 546.

Nano-peak distance 540 may be defined between nano-peaks 520. A maximum for nano-peak distance 540 may be defined. In some embodiments, nano-peak distance 540 may be at most 1000 (in some embodiments, at most 750, 700, 600, 500, 400, 300, 250, 200, 150, or even at most 100) nanometers. In some embodiments, nano-peak distance 540 is at most 400 (in some embodiments, at most 300) nanometers.

A minimum for the nano-peak distance 540 may be defined. In some embodiments, nano-peak distance 540 may be at least 1 (in some embodiments, at least 5, 10, 25, 50, 75, 100, 150, 200, 250, 300, 350, 400, 450, or even at least 500) nanometers. In some embodiments, nano-peak distance 540 is at least 150 (in some embodiments, at least 200) nanometers.

In some embodiments, the nano-peak distance 540 is in a range from 150 to 400 (in some embodiments, 200 to 300) nanometers. In some embodiments, the nano-peak distance 540 is 250 nanometers.

Nano-peak distance 540 may be defined relative to the micro-peak distance 440 between corresponding micro-peaks 420. In some embodiments, corresponding micro-peak distance 440 is at least 10 (in some embodiments, at least 50, 100, 200, 300, 400, 500, 600, 700, 800, 900, or even at least 1000) times nano-peak distance 540. In some embodiments, corresponding micro-peak distance 440 is, at the low end, at least 200 (in some embodiments, at least 300) times nano-peak distance 540. In some embodiments, corresponding micro-peak distance 440 is, at the high end, at most 500 (in some embodiments, at most 400) times the nano-peak distance 540.

In some embodiments of forming the antisoiling surface, a method may include extruding a hot melt material having a UV-stable material. The extruded material may be shaped with a micro-replication tool. The micro-replication tool may include a mirror image of a series of micro-structures, which may form the series of micro-structures on the surface of antisoiling layer 208. The series of micro-structures may include a series of alternating micro-peaks and micro-spaces along an axis. A plurality of nano-structures may be formed on the surface of the layer on at least the micro-spaces. The plurality of nano-peaks may include at least one series of nano-peaks along the axis.

In some embodiments, the plurality nano-structures may be formed by exposing the surface to reactive ion etching. For example, masking elements may be used to define the nano-peaks.

In some embodiments, the plurality of nano-structures may be formed by shaping the extruded material with the micro-replication tool further having an ion-etched diamond. This method may involve providing a diamond tool wherein at least a portion of the tool comprises a plurality of tips, wherein the pitch of the tips may be less than 1 micrometer, and cutting a substrate with the diamond tool, wherein the diamond tool may be moved in and out along a direction at a pitch (p1). The diamond tool may have a maximum cutter width (p2) and $p_1/p_2 \geq 2$.

The nano-structures may be characterized as being embedded within the micro-structured surface of the antisoiling layer 408. Except for the portion of the nano-structure exposed to air, the shape of the nano-structure may generally be defined by the adjacent micro-structured material.

A micro-structured surface layer including nano-structures can be formed by use of a multi-tipped diamond tool. Diamond Turning Machines (DTM) can be used to generate micro-replication tools for creating antisoiling surface structures including nano-structures as described in U.S. Pat. Appl. Publ. No. 2013/0236697 (Walker et al.) A micro-structured surface further comprising nano-structures can be formed by use of a multi-tipped diamond tool, which may have a single radius, wherein the plurality of tips has a pitch of less than 1 micrometer. Such multi-tipped diamond tool may also be referred to as a "nano-structured diamond tool." Hence, a micro-structured surface wherein the micro-structures further comprise nano-structures can be concurrently formed during diamond tooling fabrication of the micro-structured tool. Focused ion beam milling processes can be used to form the tips and may also be used to form the valley of the diamond tool. For example, focused ion beam milling can be used to ensure that inner surfaces of the tips meet along a common axis to form a bottom of valley. Focused ion beam milling can be used to form features in the valley, such as concave or convex arc ellipses, parabolas, mathematically defined surface patterns, or random or pseudo-random patterns. A wide variety of other shapes of valley can also be formed. Exemplary diamond turning machines and methods for creating discontinuous, or non-uniform, surface structures can include and utilize a fast tool servo (FTS) as described in, for example, PCT Pub. No. WO 00/48037, published Aug. 17, 2000; U.S. Pat. No. 7,350,442 (Ehnes et al.) and U.S. Pat. No. 7,328,638 (Gardiner et al.); and U.S. Pat. Pub. No. 2009/0147361 (Gardiner et al.).

In some embodiments, the plurality of nano-structures may be formed by shaping the extruded material, or antisoiling layer 408, with the micro-replication tool further having a nano-structured granular plating for embossing. Electrodeposition, or more specifically electrochemical deposition, can also be used to generate various surface structures including nano-structures to form a micro-replication tool. The tool may be made using a 2-part electroplating process, wherein a first electroplating procedure may form a first metal layer with a first major surface, and a second electroplating procedure may form a second metal layer on the first metal layer. The second metal layer may have a second major surface with a smaller average roughness than that of the first major surface. The second major surface can function as the structured surface of the tool. A replica of this surface can then be made in a major surface of an optical film to provide light diffusing properties. One example of an electrochemical deposition technique is described in PCT Pub. No. WO 2018/130926 (Derks et al.).

Figure 6:
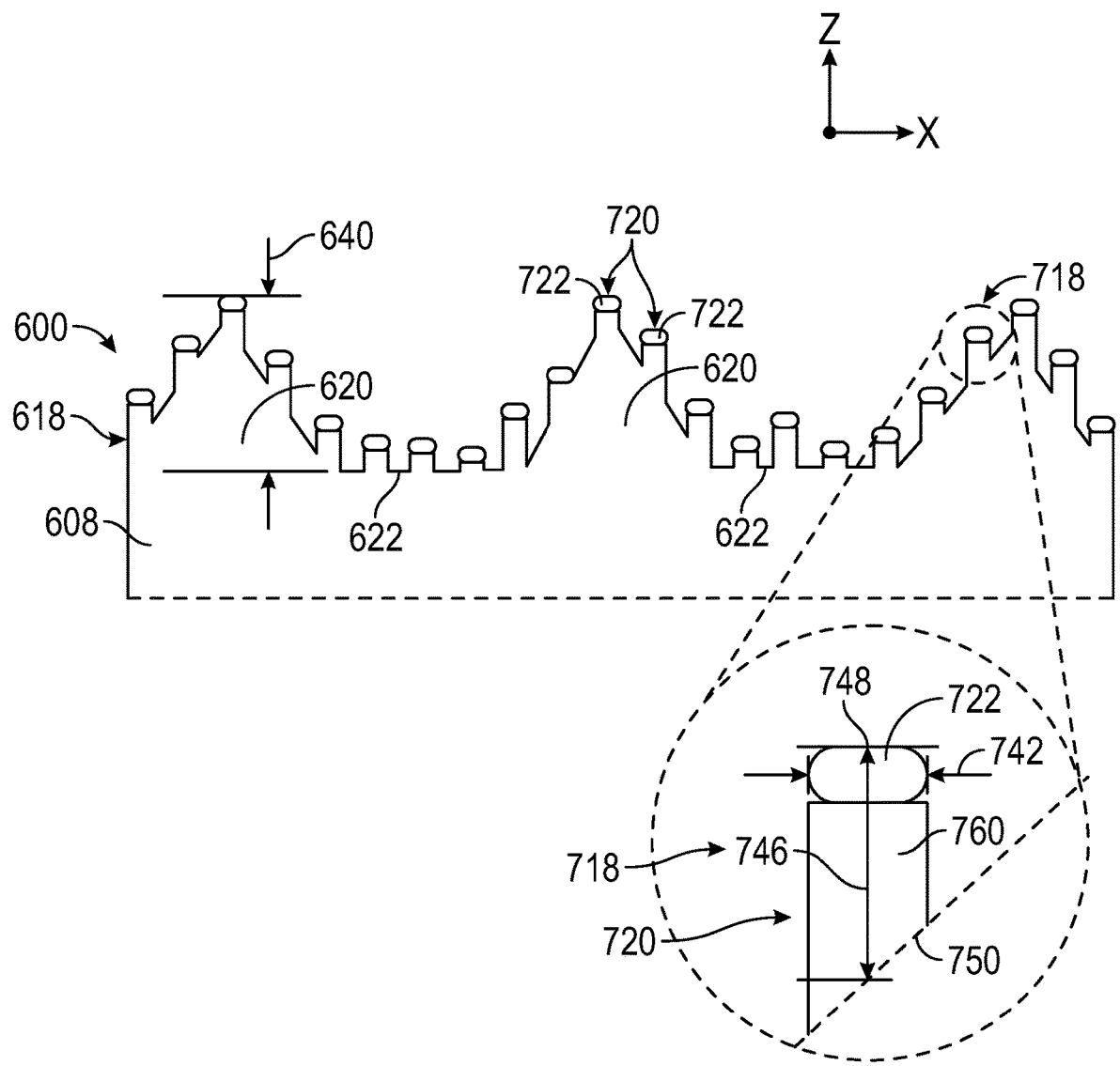
FIG. 6 is a cross-sectional illustration of various nano-structures including masking elements in an xz-plane as an alternative to the nano-structures of FIG. 5 that maybe used with the anti-reflective surface structure of FIGS. 4A-4C.

FIG. 6 shows cross section 600 of antisoiling layer 608 having antisoiling surface 602. Antisoiling surface 602 may be similar to antisoiling surface 402, for example, in that micro-structures 418, 618 of antisoiling layer 408, 608 may have the same or similar dimensions and may also form a skipped tooth riblet pattern of alternating micro-peaks 620 and micro-spaces 622. Antisoiling surface 602 differs from surface 402 in that, for example, nano-structures 720 may include nanosized masking elements 722.

Nano-structures 720 may be formed using masking elements 722. For example, masking elements 722 may be used in a subtractive manufacturing process, such as reactive ion etching (RIE), to form nano-structures 720 of surface 602 having micro-structures 618. A method of making a nano-structure and nano-structured articles may involve depositing a layer to a major surface of a substrate, such as antisoiling layer 408, by plasma chemical vapor deposition from a gaseous mixture while substantially simultaneously etching the surface with a reactive species. The method may include providing a substrate, mixing a first gaseous species capable of depositing a layer onto the substrate when formed into a plasma, with a second gaseous species capable of etching the substrate when formed into a plasma, thereby forming a gaseous mixture. The method may include forming the gaseous mixture into a plasma and exposing a surface of the substrate to the plasma, wherein the surface may be etched, and a layer may be deposited on at least a portion of the etched surface substantially simultaneously, thereby forming the nano-structure.

The substrate can be a (co)polymeric material, an inorganic material, an alloy, a solid solution, or a combination thereof. The deposited layer can include the reaction product of plasma chemical vapor deposition using a reactant gas comprising a compound selected from the group consisting of organosilicon compounds, metal alkyl compounds, metal isopropoxide compounds, metal acetylacetonate compounds, metal halide compounds, and combinations thereof. Nano-structures of high aspect ratio, and optionally with random dimensions in at least one dimension, and even in three orthogonal dimensions, can be prepared.

In some embodiments of a method of antisoiling layer 608 having a series of micro-structures 618 disposed on antisoiling surface 602 of the layer may be provided. The series of micro-structures 618 may include a series of alternating micro-peaks 620 and micro-spaces 622.

A series of nanosized masking elements 722 may be disposed on at least micro-spaces 622. Antisoiling surface 602 of antisoiling layer 608 may be exposed to reactive ion etching to form plurality of nano-structures 718 on the surface of the layer including series of nano-peaks 720. Each nano-peak 720 may include masking element 722 and column 760 of layer material between masking element 722 and layer 608.

Masking element 722 may be formed of any suitable material more resistant to the effects of RIE than the material of antisoiling layer 608. In some embodiments, masking element 722 includes an inorganic material. Non-limiting examples of inorganic materials include silica and silicon dioxide. In some embodiments, the masking element 722 is hydrophilic. Non-limiting examples of hydrophilic materials include silica and silicon dioxide.

As used herein, the term "maximum diameter" refers to a longest dimension based on a straight line passing through an element having any shape.

Masking elements 722 may be nanosized. Each masking element 722 may define maximum diameter 742. In some embodiments, the maximum diameter of masking element 722 may be at most 1000 (in some embodiments, at most 750, 500, 400, 300, 250, 200, 150, or even at most 100) nanometers.

Maximum diameter 742 of each masking element 722 may be described relative to micro-peak height 640 of corresponding micro-peak 620. In some embodiments, corresponding micro-peak height 640 is at least 10 (in some embodiments, at least 25, 50, 100, 200, 250, 300, 400, 500, 750, or even at least 1000) times maximum diameter 742 of masking element 722.

Each nano-peak 720 may define height 722. Height 722 may be defined between baseline 750 and the apex 748 of masking element 722.

Figure 7A:
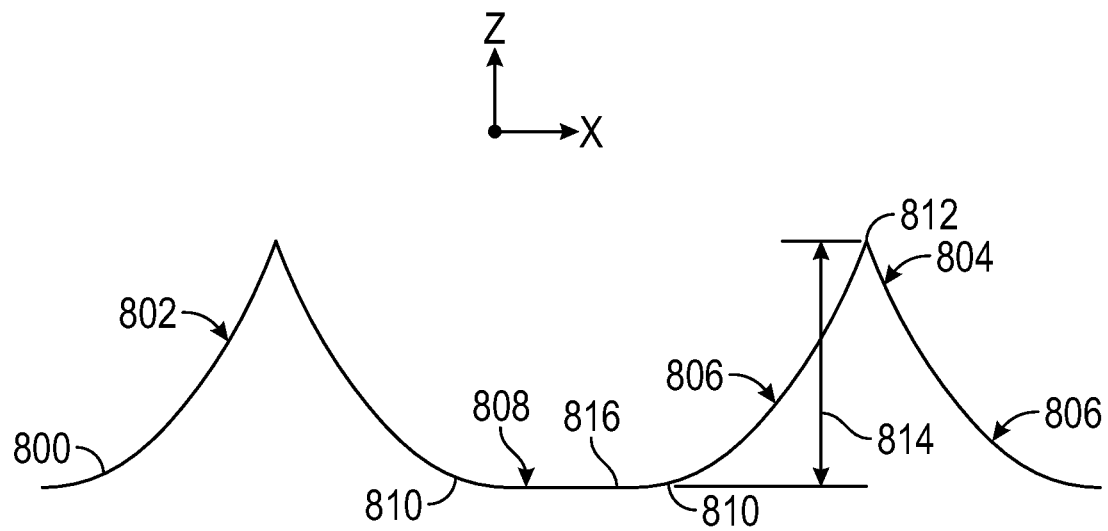
FIGS. 7A and 7B show illustrations of lines representing the cross-sectional profile of different forms of micro-structures for an anti-reflective surface structure in an xz-plane.
Figure 7B:
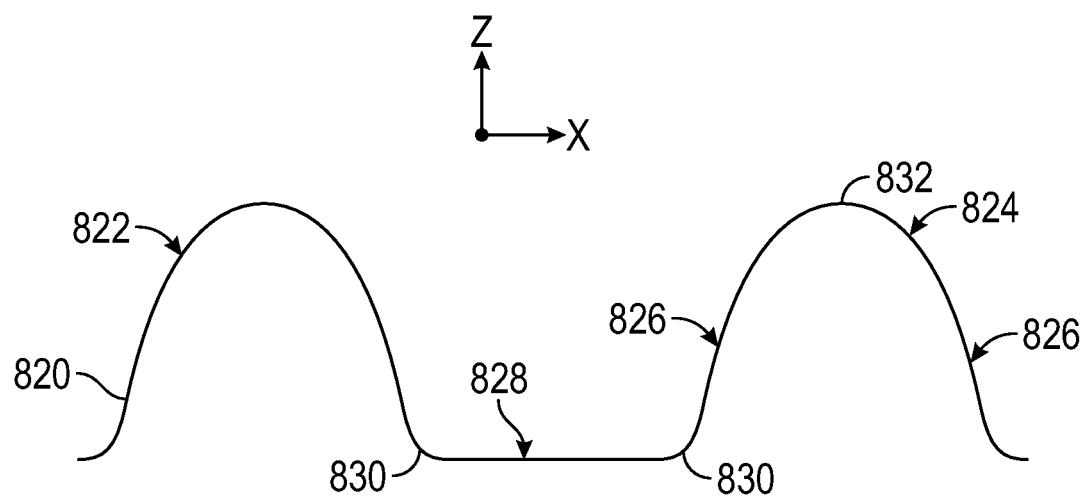

FIGS. 7A and 7B show lines 800 and 820 representing the cross-sectional profile of different forms of peaks 802, 822, which may be micro-peaks of micro-structures or nano-peaks of nano-structures, for any of the antisoiling surfaces, such as surfaces 402, 602. As mentioned, structures do not need to be strictly in the shape of a triangle.

Line 800 shows that first portion 804 (top portion) of peak 802, including apex 812, may have a generally triangular shape, whereas adjacent side portions 806 may be curved. In some embodiments, as illustrated, side portions 806 of peak 802 may not have a sharper turn as it transitions into space 808. Boundary 810 between side portion 806 of peak 802 and space 808 may be defined by a threshold slope of line 800 as discussed herein, for example, with respect to FIGS. 4A-4C and 5.

Space 808 may also be defined in terms of height relative to height 814 of peak 802. Height 814 of peak 802 may be defined between one of boundaries 810 and apex 812. Height of space 808 may be defined between bottom 816, or lowest point of space 808, and one of boundaries 810. In some embodiments, the height of space 808 may be at most 40% (in some embodiments, at most 30%, 25%, 20%, 15%, 10%, 5%, 4%, 3%, or even at most 2%) of height 814 of peak 802. In some embodiments, the height of space 808 is at most 10% (in some embodiments, at most 5%, 4%, 3%, or even at most 2%) of height 814 of peak 802.

Line 820 shows that first portion 824 (top portion) of peak 820, including the apex, may have a generally rounded shape without a sharp turn between adjacent side portions 826. Apex 832 may be defined as the highest point of structure 820, for example, where the slope changes from positive to negative. Although first portion 824 (top portion) may be rounded at apex 832, peak 820 may still define an angle, such as angle A (see FIG. 5), between first and second average slopes.

Boundary 830 between side portion 826 of peak 820 and space 828 may be defined, for example, by a sharper turn. Boundary 830 may also be defined by slope or relative height, as discussed herein.

As shown in FIGS. 8 to 11, the antisoiling surface may be discontinuous, intermittent, or non-uniform. For example, the antisoiling surface may also be described as including micro-pyramids with micro-spaces surrounding the micro-pyramids (see FIGS. 8 and 11).

Figure 8:
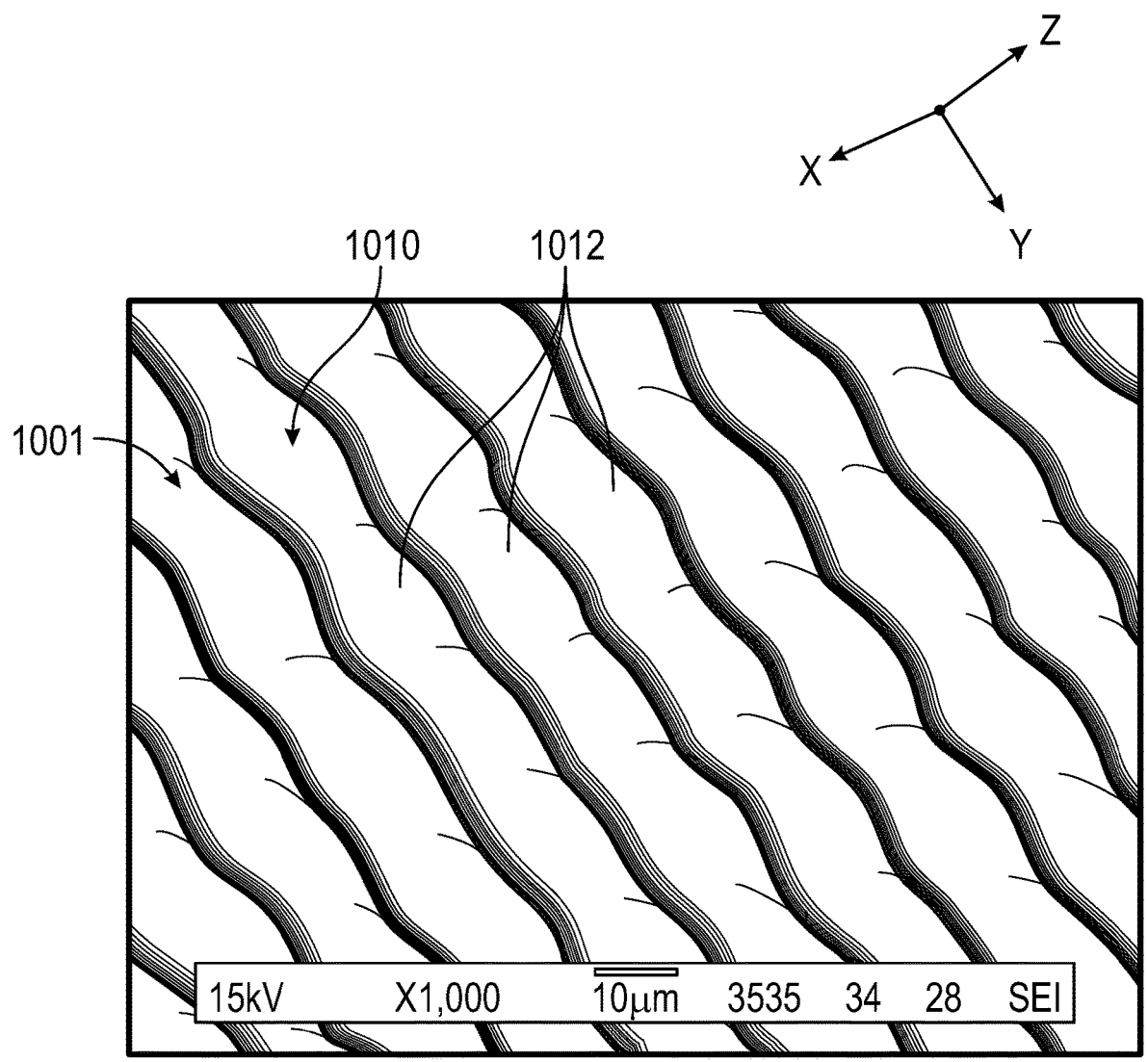
FIG. 8 is a perspective illustration of a portion of a first anti-reflective surface structure with discontinuous micro-structures.

FIG. 8 shows first antisoiling surface 1001 defined at least partially by non-uniform micro-structures 1210. For example, if antisoiling surface 1000 were viewed in the yz-plane (similar to FIG. 4B), at least one micro-peak 1012 may have a non-uniform height from the left side to the right side of the view, which can be contrasted to FIG. 4B showing micro-peak 420 having a uniform height from the left side to the right side of the view. In particular, micro-peaks 1012 defined by the micro-structures 1010 may be non-uniform in at least one of height or shape. The micro-peaks 1012 are spaced by micro-spaces (not shown in this perspective view), similar to other surfaces described herein, such as micro-space 422 of surface 402 (FIGS. 4A and 4C).

Figure 9:
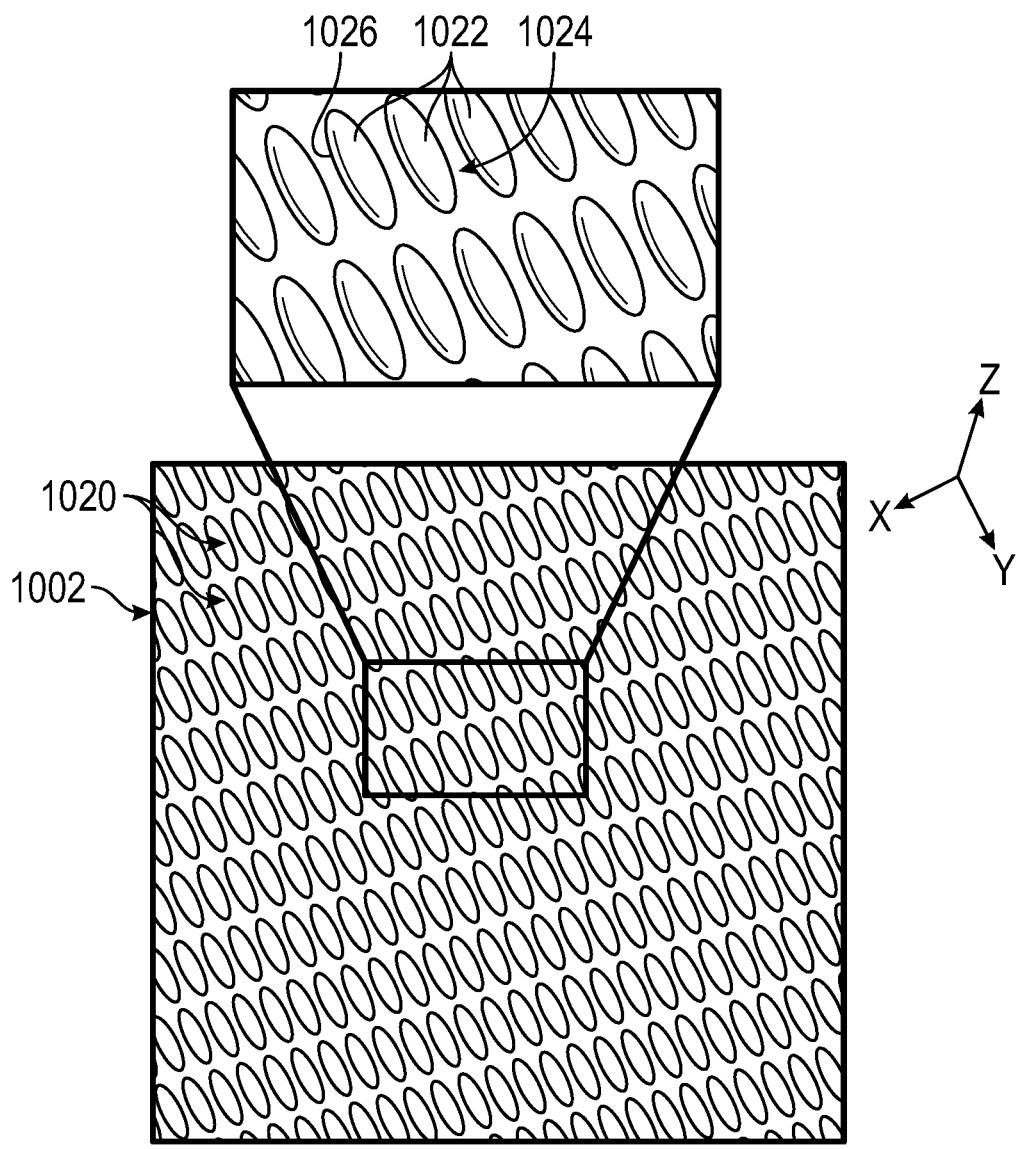
FIG. 9 is a perspective illustration of a portion of a second anti-reflective surface structure with discontinuous micro-structures.

FIG. 9 shows second antisoiling surface 1002 with discontinuous micro-structures 1020. For example, if antisoiling surface 1002 were viewed on the yz-plane (similar to FIG. 4B), more than one nano-peak 1022 may be shown spaced by micro-structures 1020, which can be contrasted to FIG. 4B showing micro-peak 420 extending continuously from the left side to the right side of the view. In particular, micro-peaks 1022 of micro-structures 1020 may be surrounded by micro-spaces 1024. Micro-peaks 1022 may each have a half dome-like shape. For example, the half dome-like shape may be a hemisphere, a half ovoid, a half-prolate spheroid, or a half-oblate spheroid. Edge 1026 of the base of each micro-peak 1022, extending around each micro-peak, may be a rounded shape (e.g., a circle, an oval, or a rounded rectangle). The shape of the micro-peaks 1022 may be uniform, as depicted in the illustrated embodiment, or can be non-uniform.

Figure 10:
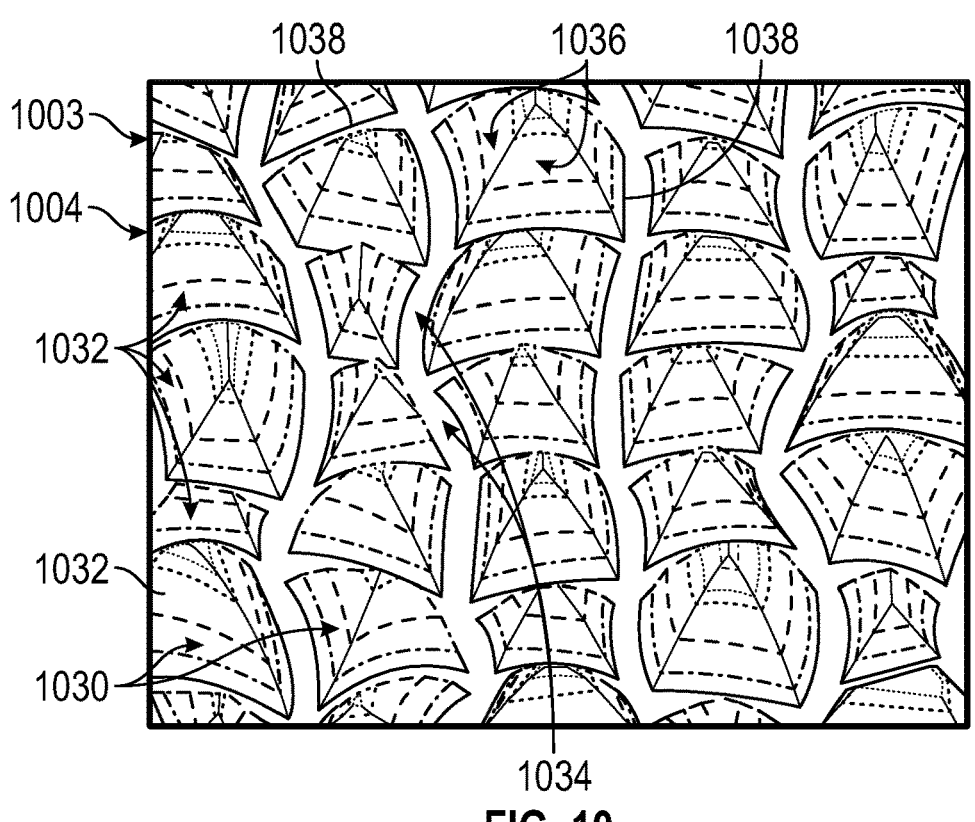
FIGS. 10 and 11 are perspective illustrations of different portions of a third anti-reflective surface structure with discontinuous micro-structures.
Figure 11:
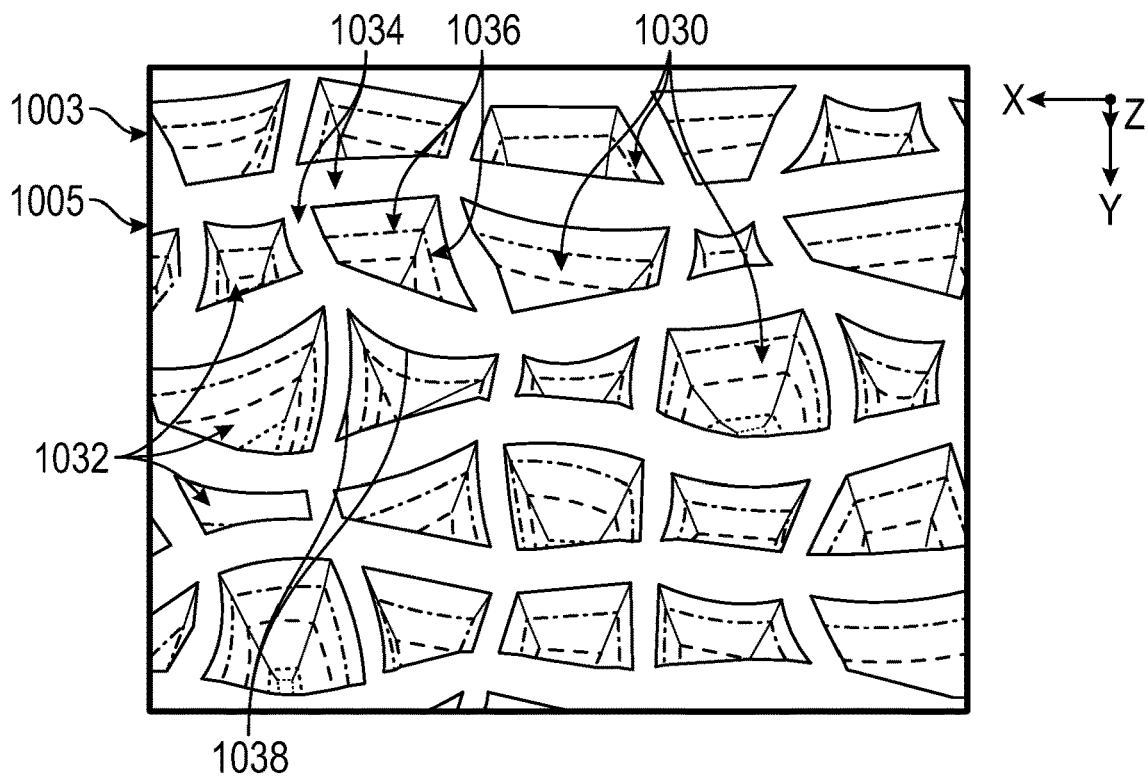

FIGS. 10 and 11 are perspective illustrations of first portion 1004 (FIG. 10) and second portion 1005 (FIG. 11) of third antisoiling surface 1003 with discontinuous micro-structures 1030. Both are perspective views. The FIG. 10 view shows more of a "front" side of the micro-structures 1030 close to a 45-degree angle, whereas the FIG. 11 view shows some of a "back" side of the micro-structures closer to an overhead angle.

Micro-peaks 1032 of micro-structures 1030 surrounded by micro-spaces 1034 may have a pyramid-like shape (e.g., micro-pyramids). For example, the pyramid-like shape may be a rectangular pyramid or a triangular pyramid. Sides 1036 of the pyramid-like shape may be non-uniform in shape or area, as depicted in the illustrated embodiment, or can be uniform in shape or area. Edges 1038 of the pyramid-like shape may be non-linear, as depicted in the illustrated embodiment, or can be linear. The overall volume of each micro-peak 1032 may be non-uniform, as depicted in the illustrated embodiment, or can be uniform.

Multilayer films can be advantageous for having physical and chemical properties on the top surface of the film that differ from the physical and chemical properties on the bottom surface of the film. For example, highly fluorinated polymers are beneficial for stain, chemical, and dirt resistance, but inherently do not adhere well to other polymers or adhesives. A first fluoropolymer layer 1501 having a high content of tetra-fluoroethylene (TFE) have higher fluorine content and thus can be beneficial as the micro-structured surface layer in articles described herein. The second fluoropolymer layer 1502 may have a lower content of TFE and still adhere well to the first fluoropolymer layer 1501. If the second fluoropolymer layer also comprises vinylidene fluoride (VDF), it will adhere well to other fluoropolymers comprising VDF, such as polyvinylidene fluoride (PVDF). If the second, or third, fluoropolymer 1503 layer comprises enough VDF, it will adhere well to non-fluorinated polymer layer 1504 such as acrylate polymers and even urethane polymers. Useful multi-layer fluoropolymer films for antisoiling surface structured films having highly fluorinated top surface layers and less fluorinated bottom surface layers are described in PCT Pub. No. WO2017/172564 A2.

Antistatic agent(s) may also be incorporated into the antisoiling layer to reduce unwanted attraction of dust, dirt, and debris. Ionic antistatic agents (e.g., under the trade designation 3M IONIC LIQUID ANTI-STAT FC-4400 or 3M IONIC LIQUID ANTI-STAT FC-5000 available from 3M Company) may be incorporated into PVDF fluoropolymer layers to provide static dissipation. Antistatic agents for PMMA and methyl methacrylate copolymer (CoPMMA) optical polymer layers may be provided as STATRITE from Lubrizol Engineered Polymers, Brecksville, Ohio. Additional antistatic agents for PMMA and CoPMMA optical polymer layers may be provided as PELESTAT from Sanyo Chemical Industries, Tokyo, Japan. Optionally, antistatic properties can be provided with transparent conductive coatings, such as: indium tin oxide (ITO), fluorine doped tin oxide (FTO), aluminum doped zinc oxide (AZO), metallic nanowires, carbon nanotubes, or a thin layer of graphene, any of which may be disposed, or coated, onto one of the layers of the antisoiling surface structured films described herein.

Optional IR-Reflective Layer

The function of the optional IR-reflective layer is to reduce (by reflection) the amount of IR thermal radiation that is generated by the reflective microporous film and transmitted toward any substrate that is intended to be cooled by the composite cooling film.

The optional IR-reflective layer may be composed of any material that has an average reflectivity of at least 50 percent over at least the wavelength range of 800 to 1300 nm, and preferably 700 to 2500 nm, and more preferably 700 to 3000 nm.

Exemplary IR-reflective layers include IR-reflective multilayer films, for example, as described in the section on UV-reflective multilayer films hereinabove, except tuned to infrared wavelengths. For multilayer optical films concerned with the visible and the near infrared wavelengths, a quarterwave stack design results in each of the layers 312, 314 (see FIG. 3) in the multilayer stack having an average thickness of not more than about 0.7 micrometers.

Multilayer optical films (including reflective polarizers and mirrors) can be made by coextrusion of alternating polymer layers having different refractive indices, for example, as described in U.S. Pat. No. 6,045,894 (Jonza et al.); U.S. Pat. No. 6,368,699 (Gilbert et al.); U.S. Pat. No. 6,531,230 (Weber et al.); U.S. Pat. No. 6,667,095 (Wheatley et al.); U.S. Pat. No. 6,783,349 (Neavin et al.); U.S. Pat. No. 7,271,951 B2 (Weber et al); U.S. Pat. No. 7,632,568 (Padiyath et al.); and U.S. Pat. No. 7,952,805 (McGurran et al.); and PCT Publications WO 95/17303 (Ouderkirk et al.) and WO 99/39224 (Ouderkirk et al.).

Exemplary IR-reflective layers also include: layers of a metal such as, for example, aluminum, gold, or silver; and layers of metal oxide or metal sulfide such as, for example, cerium oxide, aluminum oxide, magnesium oxide, and indium tin oxide.

Other IR-reflective layers known in the art may also be used.

Optional Adhesive Layers

The optional adhesive layers may comprise any adhesive (e.g., thermosetting adhesive, hot melt adhesive, and/or pressure-sensitive adhesive). If present, optional adhesive layer preferably comprises a pressure-sensitive adhesive. In some embodiments, the adhesive may be resistant to ultraviolet radiation damage. Exemplary adhesives which are typically resistant to ultraviolet radiation damage include silicone adhesives and acrylic adhesives containing UV-stabilizing/blocking additive(s), for example, as discussed hereinabove.

The optional adhesive layers may comprise thermally-conductive particles to aid in heat transfer. Exemplary thermally-conductive particles include aluminum oxide particles, alumina nanoparticles, hexagonal boron nitride particles and agglomerates (e.g., available as 3M BORON DINITRIDE from 3M Company), graphene particles, graphene oxide particles, metal particles, and combinations thereof.

Optional releasable liners may comprise, for example, a polyolefin film, a fluoropolymer film, a coated PET film, or a siliconized film or paper.

UV-Stabilizing Additives

UV-stabilizing additives may be added to any component of the composite cooling film (e.g., the UV-reflective multilayer optical film, the optional antisoiling layer, optional adhesive layers, the reflective microporous layer, and/or the IR-reflective layer)

UV stabilization with UV-absorbers (UVAs) and/or Hindered Amine Light Stabilizers (HALS) can intervene in the prevention of photo-oxidation degradation of PET, PMMA, and CoPMMAs. Exemplary UVAs for incorporation into PET, PMMA, or CoPMMA polymer layers include benzophenones, benzotriazoles, and benzotriazines. Commercially available UVAs for incorporation into PET, PMMA, or CoPMMA optical layers include those available as TINUVIN 1577 and TINUVIN 1600 from BASF Corporation, Florham Park, New Jersey Typically, UVAs are incorporated in polymers at a concentration of 1 to 10 weight percent (wt. %).

Exemplary HALS compounds for incorporation into PET, PMMA, or CoPMMA optical layers include those available as CHIMMASORB 944 and TINUVIN 123 from BASF Corporation. Typically, HALS compounds are incorporated into the polymer at a 0.1-1.0 wt. %. A 10:1 ratio of UVA to HALS may be preferred.

UVAs and HALS compounds can also be incorporated into the fluoropolymer layers. U.S. Pat. No. 9,670,300 (Olson et al.) and U.S. Pat. App. Pub. No. 2017/0198129 (Olson et al.) describe exemplary UVA oligomers that are compatible with PVDF fluoropolymers.

Other UV-blocking additives may be included in the fluoropolymer layers. For example, small particle non-pigmentary zinc oxide and titanium oxide can be used. Nanoscale particles of zinc oxide, calcium carbonate, and barium sulfate reflect, or scatter, UV-light while being transparent to visible and near infrared light. Small zinc oxide and barium sulfate particles in the size range of 10-100 nanometers can reflect UV-radiation are available, for example, from Kobo Products Inc., South Plainfield, New Jersey Antistatic agents may also be incorporated into any of the polymer films/layers to reduce unwanted attraction of dust, dirt, and debris. Ionic salt antistatic additives available from 3M Company may be incorporated into PVDF fluoropolymer layers to provide static dissipation. Exemplary antistatic agents for PMMA and CoPMMA are commercially available as STAT-RITE from Lubrizol Engineered Polymers, Brecksville, Ohio, or as PELESTAT from Sanyo Chemical Industries, Tokyo, Japan.

Uses

Composite cooling films according to the present disclosure can be used to cool a substrate with which they are in thermal (e.g., inductive, convective, radiative) communication.

Reflectance in the solar region may be particularly effective in facilitating cooling during the day when subjected to sunlight by reflecting sunlight that would otherwise be absorbed by the object. Absorption in the atmospheric window region may be particularly effective in facilitating cooling at night by radiating or emitting infrared light. Energy may also be radiated or emitted during the day to some degree. In some embodiments, the outer layer of the article will absorb a minimum of solar energy from 0.3 to 2.5 micrometers and absorb a maximum of solar energy from 8 to 14 micrometers.

Figure 12:
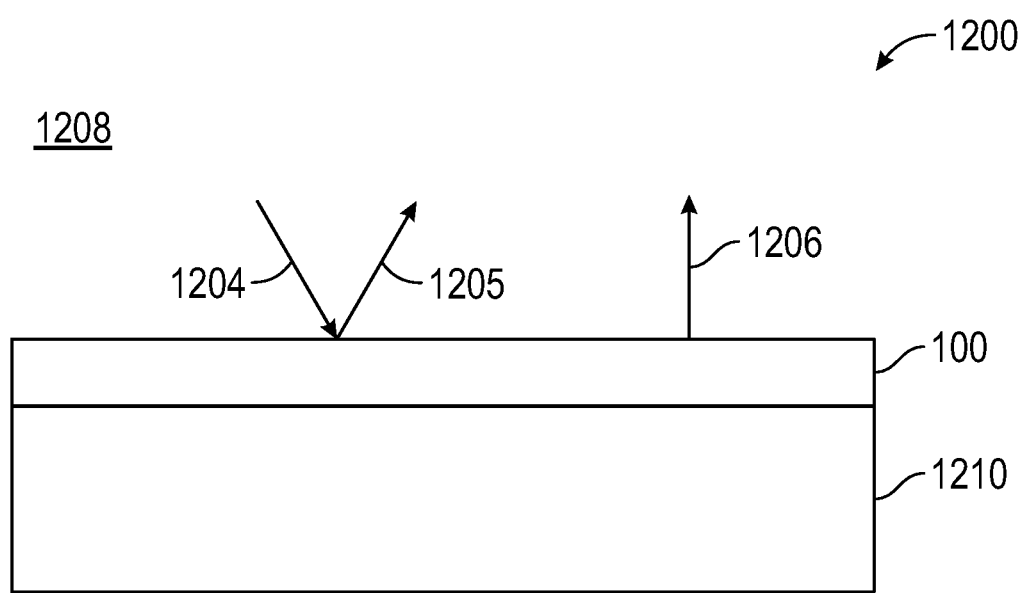
FIG. 12 is a schematic side view of a composite cooling film 1612 secured to substrate 1610.

Referring now to FIG. 12, article 1200 comprises composite cooling film 100 be secured to substrate 1210 such that composite cooling film 100 is in thermal communication with substrate 1210. Composite cooling film 1200 may be generally planar in shape; however it does not need to be planar and may be flexible to conform to substrate 1210. It will be understood that in FIG. 12, optional antisoiling layer 130 (see FIG. 1) is disposed furthest from substrate 1210.

Composite cooling film 1200 may reflect sunlight 1204 to cool substrate 1210, which may be particularly effective in daytime environment. Without composite cooling film 1200, sunlight 1204 may be absorbed by the substrate 1210 and converted into heat. Reflected sunlight 1205 may be directed into atmosphere 1208.

Composite cooling film 1200 may radiate light 1206 in the atmospheric window region of the electromagnetic spectrum into atmosphere 1208 to cool substrate 1210, which may be particularly effective in the nighttime environment. Composite cooling film 1212 may allow heat to be converted into light 1206 (e.g., infrared light) capable of escaping atmosphere 1208 through the atmospheric window. The radiation of light 1206 may be a property of composite cooling film 1200 that does not require additional energy and may be described as passive radiation, which may cool composite cooling film 1200 and substrate 1210 which is thermally coupled to composite cooling film 1200. During the day, the reflective properties allow composite cooling film 1200 to emit more energy than is absorbed. The radiative properties in combination with the reflective properties, to reflect sunlight during the day, the composite cooling film 1200 may provide more cooling than an article that only radiates energy through the atmosphere and into space.

Exemplary substrates include vehicles (e.g., the roof, body panels and or windows), buildings (e.g., roofs, walls), heat exchangers, clothing, umbrellas, hats, boats, and railcars. Exemplary substrates may be part of a larger article, apparatus, or system (e.g., a window of building).

Among other parameters, the amount of cooling and temperature reduction may depend on the reflective and absorptive properties of composite cooling film 1200. The cooling effect of composite cooling film 1200 may be described with reference to a first temperature of the ambient air proximate or adjacent to the substrate and a second temperature of the portion of substrate 1210 proximate or adjacent to composite cooling film 1200. In some embodiments, the first temperature is greater than the second temperature by at least 2.7 (in some embodiments, at least 5.5, 8.3, or even at least 11.1) degrees Celsius (e.g., at least 5, 10, 15, or even at least 20 degrees Fahrenheit).

Select Embodiments of the Present Disclosure

In a first embodiment, the present disclosure provides a composite cooling film comprising:
an ultraviolet-reflective multilayer optical film that is at least 50 percent reflective of ultraviolet radiation over a majority of the wavelength range of at least 340 but less than 400 nanometers; and
a reflective microporous layer secured to the ultraviolet-reflective multilayer optical film, wherein the reflective microporous layer has a continuous phase comprising a nonfluorinated organic polymer and is diffusely reflective of solar radiation over a majority the wavelength range of 400 to 2500 nanometers, inclusive,
wherein the composite cooling film has an average absorbance over the wavelength range 8-13 microns of at least 0.85.

In a second embodiment, the present disclosure provides a composite cooling film according to the first embodiment, wherein the ultraviolet-reflective multilayer optical film comprises an outer antisoiling surface, wherein the outer antisoiling surface extends along an axis, and wherein a plane containing the axis defines a cross-section of the layer and intersects the surface to define a line describing the surface in two dimensions, the layer comprising:
a series of micro-structures at least partially defined by the line, the line defining a series of alternating micro-peaks and micro-spaces along the axis, wherein each micro-space comprises a maximum absolute slope defining an angle from the axis of at most 30 degrees, wherein each micro-peak comprises a first micro-segment defining a first average slope and a second micro-segment defining a second average slope, and wherein an angle formed between the first and second average slopes is at most 120 degrees; and
a plurality of nano-structures at least partially defined by the line, the line defining at least one series of nano-peaks disposed on at least the micro-spaces along the axis,
wherein each nano-peak has a height and each corresponding micro-peak has a height of at least 10 times the height of the nano-peak.

In a third embodiment, the present disclosure provides a composite cooling film according to the second embodiment, wherein the micro-peak first average slope is positive, and the micro-peak second average slope is negative.

In a fourth embodiment, the present disclosure provides a composite cooling film according to the second or third embodiment, wherein an absolute value of the micro-peak first average slope is equal to an absolute value of the micro-peak second average slope.

In a fifth embodiment, the present disclosure provides a composite cooling film according to the first embodiment, further comprising an antisoiling layer secured to the ultraviolet-reflective multilayer optical film opposite the reflective microporous layer, wherein the antisoiling layer comprises an outer antisoiling surface, wherein the outer antisoiling surface extends along an axis, and wherein a plane containing the axis defines a cross section of the layer and intersects the antisoiling surface to define a line describing the antisoiling surface in two dimensions, the layer comprising:
a series of micro-structures at least partially defined by the line, the line defining a series of alternating micro-peaks and micro-spaces along the axis, wherein a boundary between each adjacent micro-peak and micro-space includes at least one of a bend or an inflection point of the line; and
a plurality of nano-structures at least partially defined by the line, the line defining at least one series of nano-peaks disposed on at least the micro-spaces along the axis,
wherein each nano-peak has a height and each corresponding micro-peak has a height at least 10 times the height of the nano-peak.

In a sixth embodiment, the present disclosure provides a composite cooling film according to any of the second to fifth embodiments, wherein a width of each micro-space is at least one of: at least 10% of a corresponding micro-peak distance or at least 10 micrometers.

In a seventh embodiment, the present disclosure provides a composite cooling film according to any of the second to sixth embodiments, wherein a micro-peak distance between micro-peaks is in a range from 1 micrometer to 1000 micrometers.

In an eighth embodiment, the present disclosure provides a composite cooling film according to any of the second to seventh embodiments, wherein the micro-peaks have a height of at least 10 micrometers.

In a ninth embodiment, the present disclosure provides a composite cooling film according to any of the second to eighth embodiments, wherein each nano-peak comprises a first nano-segment defining a first average slope and a second nano-segment defining a second average slope, wherein an angle formed between the nano-peak first average slope and the nano-peak second average slope is at most 120 degrees.

In a tenth embodiment, the present disclosure provides a composite cooling film according to the ninth embodiment, wherein an absolute value of the nano-peak first average slope is different than an absolute value of the nano-peak second average slope.

In an eleventh embodiment, the present disclosure provides a composite cooling film according to any of the second to tenth embodiments, wherein the plurality of nano-structures is further disposed on the micro-peaks.

In a twelfth embodiment, the present disclosure provides a composite cooling film according to any of the second to eleventh embodiments, wherein each nano-peak defines a nano-peak distance and the corresponding micro-peaks define a micro-peak distance of at least 10 times the nano-peak distance.

In a thirteenth embodiment, the present disclosure provides a composite cooling film according to any of the second to twelfth embodiments, wherein a maximum nano-peak distance between nano-peaks is in a range from 1 nanometer to 1 micrometer.

In a fourteenth embodiment, the present disclosure provides a composite cooling film according to any of the second to thirteenth embodiments, wherein the nano-peaks comprise at least one masking element.

In a fifteenth embodiment, the present disclosure provides a composite cooling film according to the fourteenth embodiment, wherein the masking element has a diameter of at most 1 micrometer.

In a sixteenth embodiment, the present disclosure provides a composite cooling film according to any of the second to fifteenth embodiments, wherein the micro-peaks are non-uniform in at least one of height or shape.

In a seventeenth embodiment, the present disclosure provides a composite cooling film according to any of the first to sixteenth embodiments, wherein the ultraviolet-reflective multilayer optical film comprises alternating layers of fluoropolymer and nonfluorinated polymer.

In an eighteenth embodiment, the present disclosure provides a composite cooling film according to any of the first to seventeenth embodiments, wherein the reflective microporous layer comprises at least one of polyethylene, polypropylene, polysaccharides, or polyethylene terephthalate.

In a nineteenth embodiment, the present disclosure provides a composite cooling film according to any of the first to eighteenth embodiments, wherein the reflective microporous layer comprises polyethylene terephthalate or a modified polyethylene terephthalate.

In a twentieth embodiment, the present disclosure provides a composite cooling film according to any of the first to nineteenth embodiments, wherein the reflective microporous layer comprises a micro-voided polymer film.

In a twenty-first embodiment, the present disclosure provides a composite cooling film according to the twentieth embodiment, wherein the micro-voided polymer film further comprises white inorganic particles.

In a twenty-second embodiment, the present disclosure provides a composite cooling film according to any of the first to twenty-first embodiments, further comprising an infrared-reflective layer secured to the reflective microporous layer opposite the ultraviolet-reflective multilayer optical film, wherein the infrared-reflective layer has an average reflectance of at least 50 percent over the wavelength range of 8 to 13 microns.

In a twenty-third embodiment, the present disclosure provides an article comprising a composite cooling film of any preceding claim secured to an exterior surface of a substrate, wherein the cooling film and the substrate are in thermal communication, and wherein the UV-reflective multilayer optical film is disposed further from the substrate than the reflective microporous layer.

In a twenty-fourth embodiment, the present disclosure provides an article according to the twenty-third embodiment, wherein the reflective microporous layer comprises at least one of polyethylene, polypropylene, a polysaccharide, or polyethylene terephthalate.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Air Flow Resistance Test

Air flow resistance was measured using a densitometer (obtained as Model 4110 from Gurley Precision Instruments, Troy, NY) with a timer (obtained as Model 4320 from Gurley Precision Instruments). A sample was clamped in the tester. The timer and photo eye were reset and the cylinder was released, allowing air to pass through a 1 square inch (6.5 cm$^2$) circle with a constant force of 4.88 inches (12.4 cm) of water (1215 N/m$^2$). The time to pass 50 cm$^3$ of air was recorded.

Bubble Point Pressure Test

Bubble point pressure is a commonly used technique to characterize the largest pore in a porous membrane. Discs 47 mm in diameter were cut and samples soaked in mineral oil or isopropyl alcohol as noted to fully fill and wet out the pores within the sample. The wet samples were then placed in a holder (47 mm; Stainless Holder Part #2220 from Pall Corporation, Port Washington, NY). Pressure was slowly increased on the top of the sample using a pressure controller and gas flow was measured on the bottom with a gas flow meter. The pressure was recorded when there was a significant increase in flow from the baseline flow rate. This was reported as the bubble point pressure (pounds per square inch (psi), centimeters of mercury (cm Hg) or pascals (Pa)). This technique was a modification to ASTM F316-03 (2006), "Standard Test Methods for Pore Size Characteristics of Membrane Filters by Bubble Point and Mean Flow Pore Test," the disclosure of which is incorporated herein by reference, which included an automated pressure controller and flow meter to quantify when the bubble point pressure had been reached.

Density and Porosity Test

The density of a sample was calculated using a method similar to ASTM F-1315-17 (2017), "Standard Test Method for Density of a Sheet Gasket Material," the disclosure of which is incorporated herein by reference, by cutting eight 47 mm diameter discs, weighing the discs on an analytical balance of suitable resolution (typically 0.0001 gram), and measuring the thickness of all the discs combined on a thickness gauge (obtained as Model 49-70 from Testing Machines, Inc., New Castle, DE) with a dead weight of 7.3 psi (50.3 KPa) and a flat anvil of 0.63-inch (1.6 cm) diameter, with a dwell time of about 3 seconds and a resolution of +/−0.0001 inch. The density was then calculated by dividing the mass by the volume, which was calculated from the thickness and diameter of the sample. With the known densities and weight fractions of the components of the polymer matrix composite, the theoretical density of the polymer matrix composite was calculated by the rule of mixtures. Using the theoretical density and the measured density, the porosity was calculated as:

$$\text{porosity} = [1 - (\text{measured density}/\text{theoretical density})] \times 100$$

Preparation of UV-Reflective Multilayer Optical Film (UV-R MOF)

Figure 13:
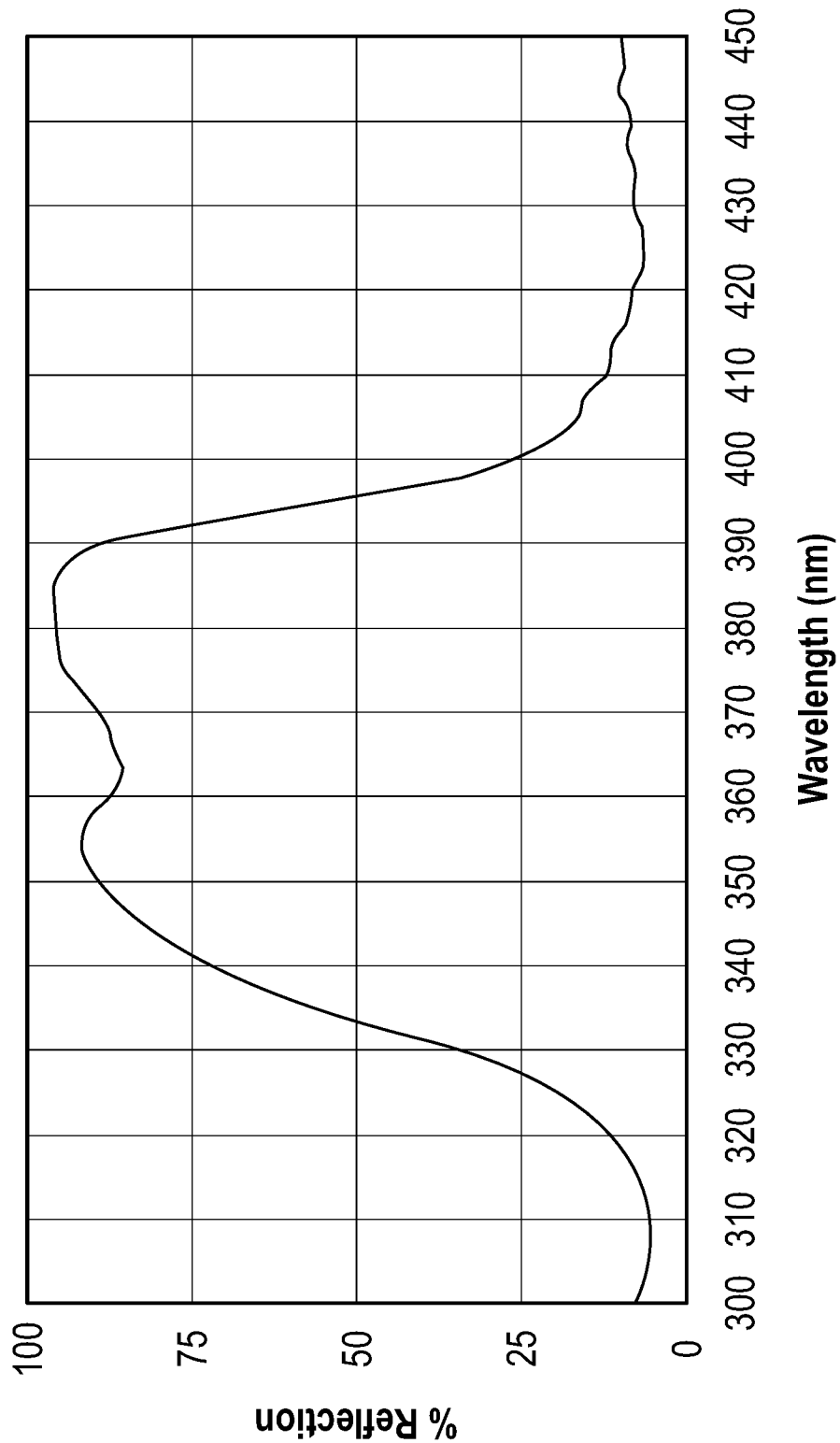
FIG. 13 is a reflection spectrum of UV-R MOF prepared in the examples.

UV-R MOF was made with first optical layers comprising a methyl methacrylate copolymer (CoPMMA) obtained as OPTIX CA-24 from Plaskolite, Columbus, Ohio, and second optical layers comprising a fluoropolymer obtained as 3M DYNEON THV 221 from 3M Company, St. Paul, Minnesota). The CoPMMA and fluoropolymer were coextruded through a multilayer melt manifold to create a multilayer melt stream having 275 alternating first and second optical layers. Non-optical protective skin layers comprising polyethylene terephthalate (PET) obtained as LASER+ C 9921 from DAK Americas LLC, Chadds Ford, Pennsylvania) were coextruded on the top and bottom surfaces of the 275 optical layer stack. This 277-layer multilayer coextruded melt stream was cast onto a chilled roll at 22 meters per minute creating a multilayer cast web approximately 500 micrometers thick. The multilayer cast web was then heated to 130° C. for 10 seconds prior to being uniaxially stretched (i.e., oriented) in the length direction at a draw ratio of 3.8, and subsequently quenched to 60° C. The uniaxially oriented film was then heated to 135° C. for 10 seconds prior to being uniaxially stretched to orient in the transverse direction at a draw ratio of 3.8:1, to create a biaxially oriented UV mirror film reflecting wavelengths of 350 nm to 400 nm. Reflection spectra were measured with a LAMBDA 900 spectrophotometer from PerkinElmer, Inc., Waltham, Massachusetts, and were found to have the reflection spectrum shown in FIG. 13.

Example 1

Figure 14:
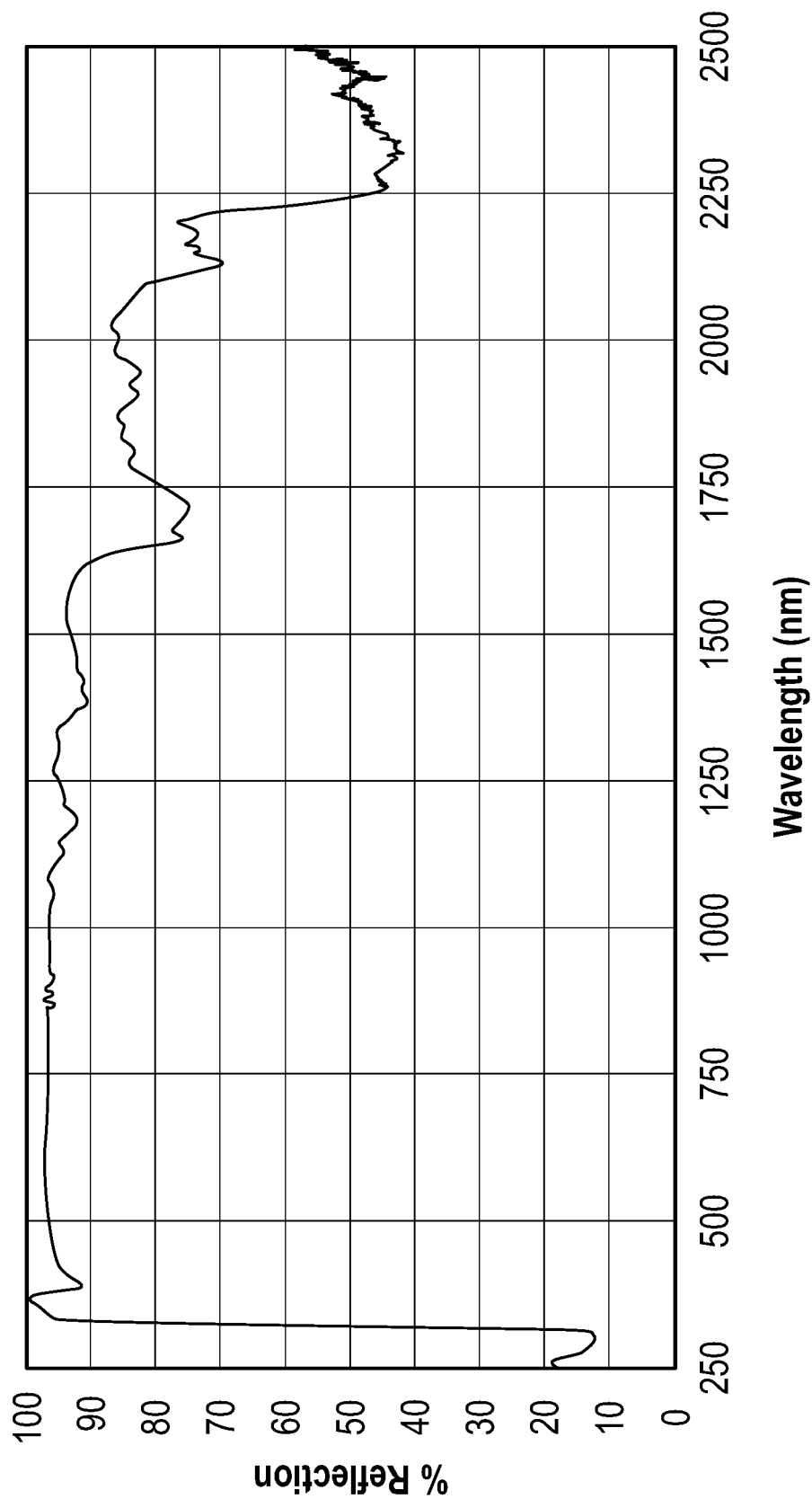
FIG. 14 is a reflection spectrum of UV-R MOF on micro-voided PET prepared in Example 1.

UV-R MOF was laminated to 188 microns thick micro-voided PET film containing barium sulfate particles obtained as LUMIRROR XJSA2 from Toray Plastics (America) Inc., North Kingstown, Rhode Island using an optically clear adhesive obtained as OCA 8172 from 3M Company. After removing the PET top skin layer, the reflection spectrum of the micro-voided PET film laminated to the UV-reflective multilayer optical film mirror was measured with a spectrophotometer (Lambda 900) and was found to have the reflection spectrum shown in FIG. 14.

The above-described film laminate was then laminated to an aluminum plate having a J-type thermocouple embedded in its surface and adhered with 3M 425 HD 6127-41 aluminum-backed tape from 3M Company to create radiative cooling plate RCP1. One-inch" thick Styrofoam insulation was also placed under the aluminum radiative cooling plate to thermally isolate it from the ground. Another bare aluminum plate with a J-type thermocouple embedded in its surface and adhered with 3M 425 HD 6127-41 aluminum-backed tape was used as the control radiative cooling plate. 1" thick Styrofoam insulation was also placed under the aluminum control radiative cooling plate to thermally isolate it from the ground. With an ambient air temperature of 23.4° C. and relative humidity of 30 percent, the two radiative cooling plates were placed under the sun at noon. After 1 hr of temperature equilibration, the temperature of CRCP was measured to be 32.9° C., and the temperature of RCP1 was measured to be 17.5° C., or 5.9° C. below ambient temperature.

Example 2

A surface-structured fluoropolymer film was made by extruding KYNAR 710 PVDF fluoropolymer obtained from Arkema, Inc., King of Prussia, Pennsylvania, against a nano-micro-replication casting tool to create the surface structure shown in FIG. 5. The PVDF was extruded at a rate of 90.9 kg per hour and a temperature of 204° C. at a line speed of 0.44 meters per second. The surface-structured fluoropolymer film was then laminated to RCP1 described in Example 1 to create radiative cooling plate RCP2 having a dirt-resistant surface structure. One-inch thick Styrofoam insulation was also placed under the aluminum radiative cooling plate to thermally isolate it from the ground. With an ambient air temperature of 20.2° C. and relative humidity of 40 percent, RCP2 was placed under the sun at noon with the same control radiative cooling plate CRCP described in Example 1. After 1 hr of temperature equilibration, the temperature of the CRCP was measured to be 30.9° C., and the temperature of RCP2 was measured to be 15.5° C., or 5.3° C. below ambient temperature.

Example 3

Figure 15:
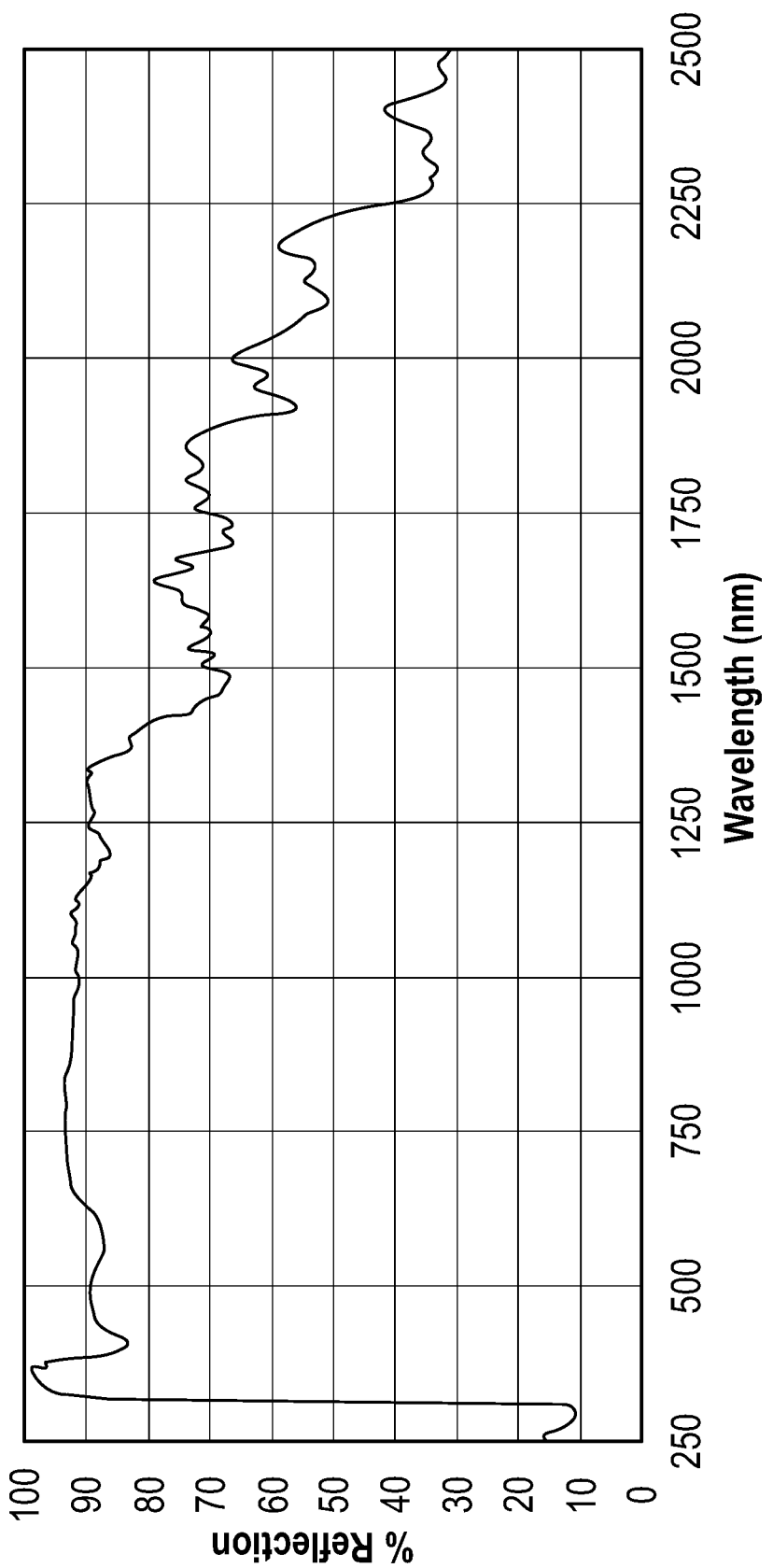
FIG. 15 is a reflection spectrum of UV-R MOF on micro-voided PET prepared in Example 3.

UV-R MOF was laminated to 188 microns thick ACCENT OPAQUE DIGITAL 188093 micro-voided heavy white paper obtained from International Paper Co., Memphis, Tennessee using OCA 8172 optically clear adhesive. After removing the PET top skin layer, the reflection spectrum of the micro-voided paper laminated to the UV-reflective MOF was measured with a LAMBDA 900 spectrophotometer and was found to have the reflection spectrum shown in FIG. 15.

The above-described film laminate was then laminated to an aluminum plate having a J-type thermocouple embedded in its surface and adhered with 3M 425 HD 6127-41 aluminum-backed tape to create radiative cooling plate RCP3. One-inch thick Styrofoam was also placed under the aluminum radiative cooling plate to thermally isolate it from the ground. Another bare aluminum plate with J-type thermocouple embedded in its surface and adhered with 3M 425 HD 6127-41 aluminum-backed tape was used as the control radiative cooling plate. With an ambient air temperature of 23.4° C. and relative humidity of 30 percent, the two radiative cooling plates were placed under the sun at noon. After 1 hr of temperature equilibration, the temperature of the control radiative cooling plate was measured to be 28.9° C. and the temperature of RCP3 was measured to be 26.5° C., or 2.4° C. below ambient temperature.

Example 4

A microporous polypropylene membrane was created by blending F008F polypropylene polymer pellets from Braskem America, Inc., Philadelphia, Pennsylvania, and 2.5 percent of MILLAD 3988 in F008F PPA06422495 nucleating agent pellets from Clariant. Masterbatches, Minneapolis, Minnesota Resin pellets were introduced into the hopper of a 40 mm co-rotating twin screw extruder with a screw speed of 225 RPM. Mineral oil diluent was injected into the third heated zone of the extruder. The weight ratio of the polypropylene/diluent/nucleating agent was 27.26170.7/2.04, respectively. The total extrusion rate was about 22.7 kilograms per hour (kg/hr). The extruder's eight zones were set to provide a temperature profile for zones 1 to 8 of 204° C., 271° C., 271° C., 249° C., 193° C., 182° C., 177° C., and 177° C., respectively. The melt composition was uniformity mixed and subsequently pumped through a double-chromed coat-hanger slot film die maintained at 177° C. and cast onto a patterned casting wheel maintained at a wheel temperature of 60° C., with a gap between the film die and the casting wheel of 1.27 cm. The casting speed was 3.66 m/min, and the film was washed in-line in a continuous manner to remove the mineral oil using 3M NOVEC 721E Engineered Fluid mixed solvent from 3M Company, St. Paul, Minnesota) and then air dried.

The resulting microporous polypropylene material was sequentially stretch-oriented in a length orienter machine to a stretch ratio of 1.9:1, and then in the cross-direction in a tenter oven, equipped with eight temperature zones, to a stretch ratio of 2.6:1. The length direction stretch was made at 99° C. The temperatures in the 8 zones of the tenter oven were as follows: zone1: 121° C.; zone 2: 121° C., zone 3: 135° C., zone 4: 135° C., zone 5: 135° C., zone 6: 149° C., zone 7: 149° C., zone 8: 149° C. The resulting oriented microporous polypropylene membrane was 119.4 microns thick, a density of 0.16 g/cc, a porosity of 82%, a Gurley air flow time of 6.2 sec/50 cc, and a bubble point pressure of 74.5f kilopascal using isopropyl alcohol.

UV-R MOF and four layers of the micro-porous PVDF material were then stacked and laminated with OCA 8171 optically clear adhesive to an aluminum plate having a J-type thermocouple embedded in its surface and adhered with 3M 425 HD 6127-41 aluminum backed tape to create radiative cooling plate RCP4. One-inch thick Styrofoam was also placed under the aluminum radiative cooling plate to thermally isolate it from the ground. Another bare aluminum plate with J-type thermocouple embedded in its surface and adhered with 3M 425 HD 6127-41 aluminum backed tape was used as the control radiative cooling plate. One-inch thick Styrofoam was also placed under the aluminum control radiative cooling plate to thermally isolate it from the ground. With an ambient air temperature of 17.8° C., the two radiative cooling plates were placed under the sun at noon. After 1 hr of temperature equilibration, the temperature of the control radiative cooling plate was measured to be 25.6° C. and the temperature of RCP4 was measured to be 16.7° C., or 1.1° C. below ambient temperature.

Example 5

A microporous polyethylene was created with FINA-THENE 7208 HDPE High Density Polyethylene (HDPE) polymer pellets from Total Petrochemicals USA, Inc., Houston, Texas). The pellets were fed into the hopper of a 40 mm co-rotating twin screw extruder with a screw speed of 250 RPM. DUOPRIME OIL 300 mineral oil diluent from Citgo Petroleum Corp., Houston, Texas, was injected into the third heated zone of the extruder. The weight ratio of the HDPE polymer/diluent was 40/60 respectively. The total extrusion rate was about 20.4 kilograms per hour (kg/hr). The extruder's eight zones were set to provide a temperature profile for zones 1 to 8 of 232° C., 271° C., 260° C., 249° C., 238° C., 227° C., 216° C., and 204° C., respectively. The melt composition was uniformly mixed, pumped through a double-chromed coat-hanger slot film die maintained at 204° C., and cast onto a patterned casting wheel maintained at a wheel temperature of 43.3° C. Water at 37.7° C. was applied uniformly on top of the film and casting wheel at a rate of 1.9 liters per minute. The casting speed was 2.5 m/min. The resulting film was washed in-line in a continuous manner to remove the mineral oil using VERTREL 423 specialty fluid from The Chemours Co., Wilmington, Delaware and then air dried.

The microporous HDPE material was sequentially stretch-oriented in a length orienter machine to a stretch ratio of 3:1, and then stretched in the cross-direction in a tenter oven equipped eight temperature zones to a stretch ratio of 1.9:1. The length direction stretch was made at 93° C. The temperatures in the 8 zones of the tenter oven were as follows: zone1: 113° C., zone 2: 113° C., zone 3: 113° C., zone 4: 113° C., zone 5: 121° C. zone 6: 121° C., zone 7: 121° C., zone 8: 121° C. The resulting oriented microporous polyethylene film was 138.4 microns thick, a density of 0.32 g/cc, a porosity of 66.4%, a Gurley air flow time of 29.1 sec/50 cc, and a bubble point pressure of 221.3 kilopascal using isopropyl alcohol.

UV-R MOF and three layers of the micro-porous polyethylene material were then stacked and laminated with OCA 8171 optically clear adhesive to an aluminum plate having a J-type thermocouple embedded in its surface and adhered with 3M 425 HD 6127-41aluminum backed tape to create radiative cooling plate RCP5. One-inch thick Styrofoam was also placed under the aluminum radiative cooling plate to thermally isolate it from the ground. Another bare aluminum plate with J-type thermocouple embedded in its surface and adhered with 3M 425 HD 6127-41aluminum backed tape was used as the control radiative cooling plate. One-inch thick Styrofoam was also placed under the aluminum control radiative cooling plate to thermally isolate it from the ground. With an ambient air temperature of 17.8° C., the two radiative cooling plates were placed under the sun at noon. After 1 hr of temperature equilibration, the temperature of the control radiative cooling plate was measured to be 25.6° C. and the temperature of radiative cooling plate 5 was measured to be 16.7° C., or 1.1° C. below ambient temperature.

All cited references, patents, and patent applications in this application are incorporated by reference in a consistent manner. In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A composite cooling film comprising:
   an ultraviolet-reflective multilayer optical film that is at least 50 percent reflective of ultraviolet radiation over a majority of a first wavelength range of at least 340 but less than 400 nanometers; and
   a reflective microporous layer secured to the ultraviolet-reflective multilayer optical film, wherein the reflective microporous layer has a continuous phase comprising a nonfluorinated organic polymer and is diffusely reflective of solar radiation over a majority of a second wavelength range of 400 to 2500 nanometers, inclusive,
   wherein the composite cooling film has an average absorbance of solar radiation over a third wavelength range of 8 to 13 microns of at least 0.85.

2. The composite cooling film of claim 1, wherein the ultraviolet-reflective multilayer optical film comprises a fluoropolymer skin layer comprising an outer antisoiling surface, wherein the outer antisoiling surface extends along an axis, and wherein a plane containing the axis defines a cross-section of the skin layer and intersects the surface to define a line describing the surface in two dimensions, the skin layer comprising:
   a series of micro-structures at least partially defined by the line, the line defining a series of alternating micro-peaks and micro-spaces along the axis, wherein each micro-space comprises a maximum absolute slope defining an angle from the axis of at most 30 degrees, wherein each micro-peak comprises a first micro-segment defining a first average slope and a second micro-segment defining a second average slope, and wherein an angle formed between the first and second average slopes is at most 120 degrees; and
   a plurality of nano-structures at least partially defined by the line, the line defining at least one series of nano-peaks disposed on at least the micro-spaces along the axis,
   wherein each nano-peak has a height and each corresponding micro-peak has a height of at least 10 times the height of the nano-peak.

3. The composite cooling film of claim 2, wherein the micro-peak first average slope is positive, and the micro-peak second average slope is negative.

4. The composite cooling film of claim 2, wherein an absolute value of the micro-peak first average slope is equal to an absolute value of the micro-peak second average slope.

5. The composite cooling film of claim 2, wherein a width of each micro-space is at least one of: at least 10% of a corresponding micro-peak distance or at least 10 micrometers.

6. The composite cooling film of claim 2, wherein a micro-peak distance between micro-peaks is in a range from 1 micrometer to 1000 micrometers.

7. The composite cooling film of claim 2, wherein the micro-peaks have a height of at least 10 micrometers.

8. The composite cooling film of claim 2, wherein each nano-peak comprises a first nano-segment defining a first average slope and a second nano-segment defining a second average slope, wherein an angle formed between the nano-segment first average slope and the nano-segment second average slope is at most 120 degrees.

9. The composite cooling film of claim 8, wherein an absolute value of the nano-segment first average slope is different than an absolute value of the nano-segment second average slope.

10. The composite cooling film of claim 2, wherein the plurality of nano-structures is further disposed on the micro-peaks.

11. The composite cooling film of claim 2, wherein each nano-peak defines a nano-peak distance and the corresponding micro-peaks define a micro-peak distance of at least 10 times the nano-peak distance.

12. The composite cooling film of claim 2, wherein a maximum nano-peak distance between nano-peaks is in a range from 1 nanometer to 1 micrometer.

13. The composite cooling film of claim 2, wherein the nano-peaks comprise at least one masking element.

14. The composite cooling film of claim 13, wherein the masking element has a diameter of at most 1 micrometer.

15. The composite cooling film of claim 2, wherein the micro-peaks are non-uniform in at least one of height or shape.

16. The composite cooling film of claim 1, further comprising an antisoiling layer secured to the ultraviolet-reflective multilayer optical film opposite the reflective microporous layer, wherein the antisoiling layer comprises an outer antisoiling surface, wherein the outer antisoiling surface extends along an axis, and wherein a plane containing the axis defines a cross section of the antisoiling layer and intersects the antisoiling surface to define a line describing the antisoiling surface in two dimensions, the antisoiling layer comprising:
  a series of micro-structures at least partially defined by the line, the line defining a series of alternating micro-peaks and micro-spaces along the axis, wherein a boundary between each adjacent micro-peak and micro-space includes at least one of a bend or an inflection point of the line; and
  a plurality of nano-structures at least partially defined by the line, the line defining at least one series of nano-peaks disposed on at least the micro-spaces along the axis,
  wherein each nano-peak has a height and each corresponding micro-peak has a height at least 10 times the height of the nano-peak.

17. The composite cooling film of claim 16, wherein the ultraviolet-reflective multilayer optical film comprises alternating layers of fluoropolymer and nonfluorinated polymer.

18. The composite cooling film of claim 16, wherein the reflective microporous layer comprises at least one of polyethylene, polypropylene, polysaccharide, or polyethylene terephthalate.

19. The composite cooling film of claim 16, wherein the reflective microporous layer comprises polyethylene terephthalate or a modified polyethylene terephthalate.

20. The composite cooling film of claim 16, wherein the reflective microporous layer comprises a micro-voided polymer film.

21. The composite cooling film of claim 20, wherein the micro-voided polymer film further comprises white inorganic particles.

22. The composite cooling film of claim 16, further comprising an infrared-reflective layer secured to the reflective microporous layer opposite the ultraviolet-reflective multilayer optical film, wherein the infrared-reflective layer has an average reflectance of at least 50 percent over a fourth wavelength range of 800 to 1300 nm.

23. An article comprising a composite cooling film of claim 16 secured to an exterior surface of a substrate, wherein the cooling film and the substrate are in thermal communication, and wherein the ultraviolet reflective multilayer optical film is disposed further from the substrate than the reflective microporous layer.

24. The article of claim 23, wherein the reflective microporous layer comprises at least one of polyethylene, polypropylene, polysaccharide, or polyethylene terephthalate.

* * * * *